(12) United States Patent
Dean et al.

(10) Patent No.: US 8,856,894 B1
(45) Date of Patent: Oct. 7, 2014

(54) ALWAYS ON AUTHENTICATION

(71) Applicant: ConsumerInfo.com, Inc., Costa Mesa, CA (US)

(72) Inventors: Michael John Dean, Torrance, CA (US); Mark Joseph Kapczynski, Santa Monica, CA (US)

(73) Assignee: Consumerinfo.com, Inc., Costa Mesa, CA (US)

( * ) Notice: Subject to any disclaimer, the term of this patent is extended or adjusted under 35 U.S.C. 154(b) by 0 days.

(21) Appl. No.: 13/797,364

(22) Filed: Mar. 12, 2013

Related U.S. Application Data

(60) Provisional application No. 61/730,698, filed on Nov. 28, 2012.

(51) Int. Cl.
*H04L 9/32* (2006.01)
*H04L 29/06* (2006.01)

(52) U.S. Cl.
CPC ............................ *H04L 63/08* (2013.01)
USPC ....................... 726/5; 726/27; 713/175

(58) Field of Classification Search
None
See application file for complete search history.

(56) References Cited

U.S. PATENT DOCUMENTS

| | | | |
|---|---|---|---|
| 4,346,442 A | 8/1982 | Musmanno | |
| 4,755,940 A | 7/1988 | Brachtl et al. | |
| 4,795,890 A | 1/1989 | Goldman | |
| 4,977,595 A | 12/1990 | Ohta et al. | |
| 5,220,501 A | 6/1993 | Lawlor et al. | |
| 5,336,870 A | 8/1994 | Hughes et al. | |
| 5,351,293 A | 9/1994 | Michener et al. | |
| 5,361,201 A | 11/1994 | Jost et al. | |
| 5,383,113 A | 1/1995 | Kight et al. | |
| 5,500,513 A | 3/1996 | Langhans et al. | |
| 5,590,038 A | 12/1996 | Pitroda | |
| 5,640,577 A | 6/1997 | Scharmer | |
| 5,659,731 A | 8/1997 | Gustafson | |
| 5,715,314 A | 2/1998 | Payne et al. | |

(Continued)

FOREIGN PATENT DOCUMENTS

| EP | 0 542 298 | 5/1993 |
|---|---|---|
| EP | 1 028 401 | 8/2000 |

(Continued)

OTHER PUBLICATIONS

U.S. Appl. No. 12/705,489, filed Feb. 12, 2010, Bargoli et al.

(Continued)

*Primary Examiner* — Christopher Revak
(74) *Attorney, Agent, or Firm* — Knobbe, Martens, Olson & Bear LLP

(57) ABSTRACT

An Always-On Authentication ("AOA") system comprises a computer system, such as a server, that automatically monitors and authenticates an enrolled individual's online transactions and/or activities to, for example, detect and/or prevent fraud. The AOA system actively monitors and/or authenticates the individual's online transactions and/or activities with service providers. A risk level may be associated with transactions and/or activities, and if a monitored transaction or activity is determined to exceed risk level for the individual, the individual may be prompted for further authentication information. A risk profile may be built for the individual over time based on the individual's history or pattern of transactions and activities. The AOA system may issue a virtual credential to the individual and/or to one or more of the individual's computing devices. The virtual credential may be provided to participating service provider(s) to enable seamless authentication of the individual during his/her interactions with the service provider(s).

20 Claims, 11 Drawing Sheets

(56) References Cited

U.S. PATENT DOCUMENTS

| | | |
|---|---|---|
| 5,844,218 A | 12/1998 | Kawan et al. |
| 5,857,174 A | 1/1999 | Dugan |
| 5,903,830 A | 5/1999 | Joao et al. |
| 5,903,881 A | 5/1999 | Schrader et al. |
| 5,956,693 A | 9/1999 | Geerlings |
| 5,999,596 A | 12/1999 | Walker et al. |
| 6,021,943 A | 2/2000 | Chastain |
| 6,038,551 A | 3/2000 | Barlow et al. |
| 6,064,990 A | 5/2000 | Goldsmith |
| 6,072,894 A | 6/2000 | Payne |
| 6,073,106 A | 6/2000 | Rozen et al. |
| 6,073,140 A | 6/2000 | Morgan et al. |
| 6,115,694 A | 9/2000 | Cheetham et al. |
| 6,128,602 A | 10/2000 | Northington et al. |
| 6,233,566 B1 | 5/2001 | Levine et al. |
| 6,253,202 B1 | 6/2001 | Gilmour |
| 6,254,000 B1 | 7/2001 | Degen et al. |
| 6,263,447 B1 | 7/2001 | French et al. |
| 6,282,658 B2 | 8/2001 | French et al. |
| 6,311,169 B2 | 10/2001 | Duhon |
| 6,321,339 B1 | 11/2001 | French et al. |
| 6,327,578 B1 | 12/2001 | Linehan |
| 6,353,778 B1 | 3/2002 | Brown |
| 6,422,462 B1 | 7/2002 | Cohen |
| 6,463,533 B1 | 10/2002 | Calamera et al. |
| 6,473,740 B2 | 10/2002 | Cockrill et al. |
| 6,496,936 B1 | 12/2002 | French et al. |
| 6,523,041 B1 | 2/2003 | Morgan et al. |
| 6,581,025 B2 | 6/2003 | Lehman |
| 6,581,059 B1 | 6/2003 | Barrett et al. |
| 6,601,173 B1 | 7/2003 | Mohler |
| 6,615,193 B1 | 9/2003 | Kingdon et al. |
| 6,622,266 B1 | 9/2003 | Goddard et al. |
| 6,665,715 B1 | 12/2003 | Houri |
| 6,703,930 B2 | 3/2004 | Skinner |
| 6,750,985 B2 | 6/2004 | Rhoads |
| 6,754,665 B1 | 6/2004 | Futagami et al. |
| 6,766,946 B2 | 7/2004 | Iida et al. |
| 6,792,088 B2 | 9/2004 | Takeuchi |
| 6,792,263 B1 | 9/2004 | Kite |
| 6,804,346 B1 | 10/2004 | Mewhinney |
| 6,845,448 B1 | 1/2005 | Chaganti et al. |
| 6,857,073 B2 | 2/2005 | French et al. |
| 6,871,287 B1 | 3/2005 | Ellingson |
| 6,907,408 B2 | 6/2005 | Angel |
| 6,908,030 B2 | 6/2005 | Rajasekaran et al. |
| 6,910,624 B1 | 6/2005 | Natsuno |
| 6,934,714 B2 | 8/2005 | Meinig |
| 6,934,858 B2 | 8/2005 | Woodhill |
| 6,950,858 B2 | 9/2005 | Ogami |
| 6,968,319 B1 | 11/2005 | Remington et al. |
| 6,983,381 B2 | 1/2006 | Jerdonek |
| 6,985,887 B1 | 1/2006 | Sunstein et al. |
| 7,028,013 B2 | 4/2006 | Saeki |
| 7,028,052 B2 | 4/2006 | Chapman et al. |
| 7,046,139 B2 | 5/2006 | Kuhn et al. |
| 7,058,386 B2 | 6/2006 | McGregor et al. |
| 7,059,531 B2 | 6/2006 | Beenau et al. |
| 7,072,909 B2 | 7/2006 | Polk |
| 7,089,594 B2 | 8/2006 | Lal et al. |
| 7,121,471 B2 | 10/2006 | Beenau et al. |
| 7,133,935 B2 | 11/2006 | Hedy |
| 7,154,375 B2 | 12/2006 | Beenau et al. |
| 7,194,416 B1 | 3/2007 | Provost et al. |
| 7,209,895 B2 | 4/2007 | Kundtz et al. |
| 7,218,912 B2 | 5/2007 | Erskine et al. |
| 7,234,156 B2 | 6/2007 | French et al. |
| 7,234,160 B2 | 6/2007 | Vogel et al. |
| 7,237,267 B2 | 6/2007 | Rayes et al. |
| 7,246,067 B2 | 7/2007 | Austin et al. |
| 7,246,740 B2 | 7/2007 | Swift et al. |
| 7,281,652 B2 | 10/2007 | Foss |
| 7,302,272 B2 | 11/2007 | Ackley |
| 7,303,120 B2 | 12/2007 | Beenau et al. |
| 7,310,611 B2 | 12/2007 | Shibuya et al. |
| 7,314,167 B1 | 1/2008 | Kiliccote |
| 7,330,717 B2 | 2/2008 | Gidron et al. |
| 7,330,835 B2 | 2/2008 | Deggendorf |
| 7,333,976 B1 | 2/2008 | Auerbach et al. |
| 7,343,149 B2 | 3/2008 | Benco |
| 7,356,516 B2 | 4/2008 | Richey et al. |
| 7,370,044 B2 | 5/2008 | Mulhern et al. |
| 7,373,324 B1 | 5/2008 | Engin et al. |
| 7,383,988 B2 | 6/2008 | Slonecker, Jr. |
| 7,386,511 B2 | 6/2008 | Buchanan et al. |
| 7,389,913 B2 | 6/2008 | Starrs |
| 7,403,942 B1 | 7/2008 | Bayliss |
| 7,412,228 B2 | 8/2008 | Barclay et al. |
| 7,433,864 B2 | 10/2008 | Malik |
| 7,444,414 B2 | 10/2008 | Foster et al. |
| 7,451,095 B1 | 11/2008 | Bradley et al. |
| 7,451,113 B1 | 11/2008 | Kasower |
| 7,458,508 B1 | 12/2008 | Shao et al. |
| 7,460,857 B2 | 12/2008 | Roach, Jr. |
| 7,478,157 B2 | 1/2009 | Bohrer et al. |
| 7,490,356 B2 | 2/2009 | Lieblich et al. |
| 7,503,489 B2 | 3/2009 | Heffez |
| 7,509,117 B2 | 3/2009 | Yum |
| 7,512,221 B2 | 3/2009 | Toms |
| 7,529,698 B2 | 5/2009 | Joao |
| 7,533,179 B2 | 5/2009 | Tarquini et al. |
| 7,542,993 B2 | 6/2009 | Satterfield et al. |
| 7,548,886 B2 | 6/2009 | Kirkland et al. |
| 7,552,089 B2 | 6/2009 | Bruer et al. |
| 7,575,157 B2 | 8/2009 | Barnhardt et al. |
| 7,581,112 B2 | 8/2009 | Brown et al. |
| 7,584,146 B1 | 9/2009 | Duhon |
| 7,587,366 B2 | 9/2009 | Grim, III et al. |
| 7,603,701 B2 | 10/2009 | Gaucas |
| 7,606,725 B2 | 10/2009 | Robertson et al. |
| 7,610,216 B1 | 10/2009 | May et al. |
| 7,620,596 B2 | 11/2009 | Knudson et al. |
| 7,623,844 B2 | 11/2009 | Herrmann et al. |
| 7,644,042 B2 * | 1/2010 | Ramavarjula et al. ......... 705/44 |
| 7,647,274 B2 | 1/2010 | Peterson et al. |
| 7,647,344 B2 | 1/2010 | Skurtovich, Jr. et al. |
| 7,653,592 B1 | 1/2010 | Flaxman et al. |
| 7,653,600 B2 | 1/2010 | Gustin |
| 7,668,725 B2 | 2/2010 | Alston |
| 7,672,833 B2 | 3/2010 | Blume et al. |
| 7,688,813 B2 | 3/2010 | Shin et al. |
| 7,689,487 B1 | 3/2010 | Britto et al. |
| 7,689,505 B2 | 3/2010 | Kasower |
| 7,690,032 B1 | 3/2010 | Peirce |
| 7,698,445 B2 | 4/2010 | Fitzpatrick et al. |
| 7,708,190 B2 | 5/2010 | Brandt et al. |
| 7,715,832 B2 | 5/2010 | Zhou |
| 7,739,139 B2 | 6/2010 | Robertson et al. |
| 7,747,494 B1 | 6/2010 | Kothari et al. |
| 7,761,384 B2 | 7/2010 | Madhogarhia |
| 7,761,568 B1 | 7/2010 | Levi et al. |
| 7,765,148 B2 | 7/2010 | German et al. |
| 7,765,311 B2 | 7/2010 | Itabashi et al. |
| 7,769,696 B2 | 8/2010 | Yoda |
| 7,769,697 B2 | 8/2010 | Fieschi et al. |
| 7,774,270 B1 | 8/2010 | MacCloskey |
| 7,787,869 B2 | 8/2010 | Rice et al. |
| 7,792,715 B1 | 9/2010 | Kasower |
| 7,793,835 B1 | 9/2010 | Coggeshall et al. |
| 7,797,725 B2 | 9/2010 | Lunt et al. |
| 7,801,811 B1 | 9/2010 | Merrell et al. |
| 7,802,104 B2 | 9/2010 | Dickinson |
| 7,805,362 B1 | 9/2010 | Merrell et al. |
| 7,809,398 B2 | 10/2010 | Pearson |
| 7,827,115 B2 | 11/2010 | Weller et al. |
| 7,841,004 B1 | 11/2010 | Balducci et al. |
| 7,841,008 B1 | 11/2010 | Cole et al. |
| 7,849,014 B2 | 12/2010 | Erikson |
| 7,853,493 B2 | 12/2010 | DeBie et al. |
| 7,856,203 B2 | 12/2010 | Lipovski |
| 7,865,958 B2 | 1/2011 | Lieblich et al. |
| 7,912,865 B2 | 3/2011 | Akerman et al. |
| 7,970,679 B2 | 6/2011 | Kasower |
| 7,991,689 B1 | 8/2011 | Brunzell et al. |

(56) References Cited

U.S. PATENT DOCUMENTS

| | | |
|---|---|---|
| 7,991,901 B2 | 8/2011 | Tarquini et al. |
| 7,996,912 B2 | 8/2011 | Spalink et al. |
| 8,001,042 B1 | 8/2011 | Brunzell et al. |
| 8,032,932 B2* | 10/2011 | Speyer et al. ............ 726/9 |
| 8,037,097 B2 | 10/2011 | Guo et al. |
| 8,060,424 B2 | 11/2011 | Kasower |
| 8,078,453 B2 | 12/2011 | Shaw |
| 8,095,443 B2 | 1/2012 | DeBie |
| 8,095,458 B2 | 1/2012 | Peterson et al. |
| 8,127,986 B1 | 3/2012 | Taylor et al. |
| 8,195,549 B2 | 6/2012 | Kasower |
| 8,224,723 B2 | 7/2012 | Bosch et al. |
| 8,234,498 B2 | 7/2012 | Britti et al. |
| 8,271,393 B2 | 9/2012 | Twining et al. |
| 8,285,656 B1 | 10/2012 | Chang et al. |
| 8,290,840 B2 | 10/2012 | Kasower |
| 8,312,033 B1 | 11/2012 | McMillan |
| 8,321,952 B2 | 11/2012 | Spalink et al. |
| 8,327,429 B2* | 12/2012 | Speyer et al. ............ 726/9 |
| 8,355,967 B2 | 1/2013 | Debie et al. |
| 8,453,226 B2* | 5/2013 | Hammad .................. 726/9 |
| 8,463,919 B2 | 6/2013 | Tarquini et al. |
| 8,515,844 B2 | 8/2013 | Kasower |
| 8,533,118 B2* | 9/2013 | Weller et al. ............ 705/44 |
| 8,600,886 B2* | 12/2013 | Ramavarjula et al. ..... 705/40 |
| 2001/0001877 A1 | 5/2001 | French et al. |
| 2001/0029482 A1 | 10/2001 | Tealdi et al. |
| 2001/0039532 A1 | 11/2001 | Coleman, Jr. et al. |
| 2002/0004736 A1 | 1/2002 | Roundtree et al. |
| 2002/0026519 A1 | 2/2002 | Itabashi et al. |
| 2002/0035684 A1 | 3/2002 | Vogel et al. |
| 2002/0049624 A1 | 4/2002 | Raveis, Jr. |
| 2002/0052841 A1 | 5/2002 | Guthrie et al. |
| 2002/0069122 A1 | 6/2002 | Yun et al. |
| 2002/0077964 A1 | 6/2002 | Brody et al. |
| 2002/0082892 A1 | 6/2002 | Raffel et al. |
| 2002/0099635 A1 | 7/2002 | Guiragosian |
| 2002/0099824 A1 | 7/2002 | Bender et al. |
| 2002/0128962 A1 | 9/2002 | Kasower |
| 2002/0156676 A1 | 10/2002 | Ahrens et al. |
| 2002/0157029 A1 | 10/2002 | French et al. |
| 2002/0161664 A1 | 10/2002 | Shaya et al. |
| 2002/0169747 A1 | 11/2002 | Chapman et al. |
| 2002/0194120 A1 | 12/2002 | Russell et al. |
| 2003/0009418 A1 | 1/2003 | Green et al. |
| 2003/0009426 A1 | 1/2003 | Ruiz-Sanchez |
| 2003/0018578 A1 | 1/2003 | Schultz |
| 2003/0061163 A1 | 3/2003 | Durfield |
| 2003/0078897 A1 | 4/2003 | Florance et al. |
| 2003/0097342 A1 | 5/2003 | Whittingtom |
| 2003/0097380 A1 | 5/2003 | Mulhern et al. |
| 2003/0115133 A1 | 6/2003 | Bian |
| 2003/0171942 A1 | 9/2003 | Gaito |
| 2003/0177028 A1 | 9/2003 | Cooper et al. |
| 2003/0182214 A1 | 9/2003 | Taylor |
| 2003/0195859 A1 | 10/2003 | Lawrence |
| 2003/0220858 A1 | 11/2003 | Lam et al. |
| 2004/0006488 A1 | 1/2004 | Fitall et al. |
| 2004/0010458 A1 | 1/2004 | Friedman |
| 2004/0015714 A1 | 1/2004 | Abraham et al. |
| 2004/0015715 A1 | 1/2004 | Brown |
| 2004/0019518 A1 | 1/2004 | Abraham et al. |
| 2004/0030649 A1 | 2/2004 | Nelson et al. |
| 2004/0044563 A1 | 3/2004 | Stein |
| 2004/0044628 A1 | 3/2004 | Mathew et al. |
| 2004/0044739 A1 | 3/2004 | Ziegler |
| 2004/0062213 A1 | 4/2004 | Koss |
| 2004/0078323 A1 | 4/2004 | Johnston et al. |
| 2004/0078324 A1 | 4/2004 | Lonnberg et al. |
| 2004/0102197 A1 | 5/2004 | Dietz |
| 2004/0123162 A1 | 6/2004 | Antell et al. |
| 2004/0128150 A1 | 7/2004 | Lundegren |
| 2004/0133493 A1 | 7/2004 | Ford et al. |
| 2004/0153521 A1 | 8/2004 | Kogo |
| 2004/0158523 A1 | 8/2004 | Dort |
| 2004/0167793 A1 | 8/2004 | Masuoka et al. |
| 2004/0177035 A1 | 9/2004 | Silva |
| 2004/0193891 A1 | 9/2004 | Ollila |
| 2004/0230527 A1 | 11/2004 | Hansen et al. |
| 2004/0230534 A1 | 11/2004 | McGough |
| 2004/0236688 A1 | 11/2004 | Bozeman |
| 2004/0243450 A1 | 12/2004 | Bernard, Jr. et al. |
| 2004/0243518 A1 | 12/2004 | Clifton et al. |
| 2004/0243832 A1 | 12/2004 | Wilf et al. |
| 2005/0005168 A1 | 1/2005 | Dick |
| 2005/0027983 A1 | 2/2005 | Klawon |
| 2005/0027995 A1 | 2/2005 | Menschik et al. |
| 2005/0050027 A1 | 3/2005 | Yeh et al. |
| 2005/0055231 A1 | 3/2005 | Lee |
| 2005/0058262 A1 | 3/2005 | Timmins et al. |
| 2005/0097320 A1* | 5/2005 | Golan et al. ............ 713/166 |
| 2005/0137899 A1 | 6/2005 | Davies et al. |
| 2005/0154664 A1 | 7/2005 | Guy et al. |
| 2005/0154665 A1 | 7/2005 | Kerr |
| 2005/0166262 A1 | 7/2005 | Beattie et al. |
| 2005/0251474 A1 | 11/2005 | Shinn et al. |
| 2005/0256809 A1 | 11/2005 | Sadri |
| 2005/0273442 A1 | 12/2005 | Bennett et al. |
| 2005/0279827 A1 | 12/2005 | Mascavage et al. |
| 2005/0288998 A1 | 12/2005 | Verma et al. |
| 2006/0010487 A1 | 1/2006 | Fierer et al. |
| 2006/0036870 A1 | 2/2006 | Dasari et al. |
| 2006/0041464 A1 | 2/2006 | Powers et al. |
| 2006/0059110 A1 | 3/2006 | Madhok et al. |
| 2006/0074986 A1 | 4/2006 | Mallalieu et al. |
| 2006/0080263 A1 | 4/2006 | Willis et al. |
| 2006/0106670 A1 | 5/2006 | Cai et al. |
| 2006/0129481 A1 | 6/2006 | Bhatt et al. |
| 2006/0131390 A1 | 6/2006 | Kim |
| 2006/0155573 A1 | 7/2006 | Hartunian |
| 2006/0161435 A1 | 7/2006 | Atef et al. |
| 2006/0173776 A1 | 8/2006 | Shalley et al. |
| 2006/0178971 A1 | 8/2006 | Owen et al. |
| 2006/0204051 A1 | 9/2006 | Holland, IV |
| 2006/0218407 A1 | 9/2006 | Toms |
| 2006/0223043 A1 | 10/2006 | Dancy-Edwards et al. |
| 2006/0229943 A1 | 10/2006 | Mathias et al. |
| 2006/0229961 A1 | 10/2006 | Lyftogt et al. |
| 2006/0239512 A1 | 10/2006 | Petrillo |
| 2006/0253323 A1 | 11/2006 | Phan et al. |
| 2006/0253358 A1 | 11/2006 | Delgrosso et al. |
| 2006/0262929 A1 | 11/2006 | Vatanen et al. |
| 2006/0265243 A1 | 11/2006 | Racho et al. |
| 2006/0271456 A1 | 11/2006 | Romain et al. |
| 2006/0271457 A1 | 11/2006 | Romain et al. |
| 2007/0005508 A1 | 1/2007 | Chiang |
| 2007/0027816 A1 | 2/2007 | Writer |
| 2007/0038568 A1* | 2/2007 | Greene et al. ............ 705/50 |
| 2007/0067297 A1 | 3/2007 | Kublickis |
| 2007/0067437 A1 | 3/2007 | Sindambiwe |
| 2007/0073889 A1 | 3/2007 | Morris |
| 2007/0078985 A1 | 4/2007 | Shao et al. |
| 2007/0083460 A1 | 4/2007 | Bachenheimer |
| 2007/0112667 A1 | 5/2007 | Rucker |
| 2007/0112668 A1 | 5/2007 | Celano et al. |
| 2007/0124256 A1 | 5/2007 | Crooks et al. |
| 2007/0174122 A1 | 7/2007 | Howard et al. |
| 2007/0174186 A1 | 7/2007 | Hokland |
| 2007/0174448 A1 | 7/2007 | Ahuja et al. |
| 2007/0226047 A1 | 9/2007 | Ward |
| 2007/0244807 A1 | 10/2007 | Andringa et al. |
| 2007/0250459 A1 | 10/2007 | Schwarz et al. |
| 2007/0261114 A1 | 11/2007 | Pomerantsev |
| 2007/0262140 A1 | 11/2007 | Long, Sr. |
| 2007/0288355 A1 | 12/2007 | Roland et al. |
| 2007/0288360 A1 | 12/2007 | Seeklus |
| 2008/0010206 A1 | 1/2008 | Coleman |
| 2008/0010687 A1 | 1/2008 | Gonen et al. |
| 2008/0028067 A1 | 1/2008 | Berkhin et al. |
| 2008/0033742 A1 | 2/2008 | Bernasconi |
| 2008/0052182 A1 | 2/2008 | Marshall |
| 2008/0052244 A1 | 2/2008 | Tsuei et al. |
| 2008/0059352 A1 | 3/2008 | Chandran |
| 2008/0065774 A1 | 3/2008 | Keeler |

(56) References Cited

U.S. PATENT DOCUMENTS

| | | |
|---|---|---|
| 2008/0066188 A1 | 3/2008 | Kwak |
| 2008/0071682 A1 | 3/2008 | Dominguez |
| 2008/0077526 A1 | 3/2008 | Arumugam |
| 2008/0086759 A1 | 4/2008 | Colson |
| 2008/0091519 A1 | 4/2008 | Foss |
| 2008/0103800 A1 | 5/2008 | Domenikos et al. |
| 2008/0103972 A1 | 5/2008 | Lanc |
| 2008/0109875 A1 | 5/2008 | Kraft |
| 2008/0114670 A1 | 5/2008 | Friesen |
| 2008/0115191 A1 | 5/2008 | Kim et al. |
| 2008/0120569 A1 | 5/2008 | Mann et al. |
| 2008/0126233 A1 | 5/2008 | Hogan |
| 2008/0162317 A1 | 7/2008 | Banaugh et al. |
| 2008/0162383 A1 | 7/2008 | Kraft |
| 2008/0175360 A1 | 7/2008 | Schwarz et al. |
| 2008/0183480 A1 | 7/2008 | Carlson et al. |
| 2008/0205655 A1 | 8/2008 | Wilkins et al. |
| 2008/0208873 A1 | 8/2008 | Boehmer |
| 2008/0221972 A1 | 9/2008 | Megdal et al. |
| 2008/0222027 A1 | 9/2008 | Megdal et al. |
| 2008/0222706 A1* | 9/2008 | Renaud et al. .................... 726/4 |
| 2008/0255992 A1 | 10/2008 | Lin |
| 2008/0263058 A1 | 10/2008 | Peden |
| 2008/0270209 A1 | 10/2008 | Mauseth et al. |
| 2008/0277465 A1 | 11/2008 | Pletz et al. |
| 2008/0281737 A1 | 11/2008 | Fajardo |
| 2008/0288299 A1 | 11/2008 | Schultz |
| 2008/0294501 A1 | 11/2008 | Rennich et al. |
| 2008/0301016 A1 | 12/2008 | Durvasula et al. |
| 2008/0306750 A1 | 12/2008 | Wunder et al. |
| 2008/0319889 A1 | 12/2008 | Hammad |
| 2009/0006230 A1 | 1/2009 | Lyda et al. |
| 2009/0024484 A1 | 1/2009 | Walker et al. |
| 2009/0031426 A1 | 1/2009 | Dal Lago et al. |
| 2009/0037332 A1 | 2/2009 | Cheung et al. |
| 2009/0043691 A1 | 2/2009 | Kasower |
| 2009/0055894 A1 | 2/2009 | Lorsch |
| 2009/0060343 A1 | 3/2009 | Rosca |
| 2009/0094674 A1 | 4/2009 | Schwartz et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0126013 A1 | 5/2009 | Atwood et al. |
| 2009/0138335 A1 | 5/2009 | Lieberman |
| 2009/0144166 A1 | 6/2009 | Dickelman |
| 2009/0150166 A1 | 6/2009 | Leite et al. |
| 2009/0150238 A1 | 6/2009 | Marsh et al. |
| 2009/0177529 A1 | 7/2009 | Hadi |
| 2009/0177562 A1 | 7/2009 | Peace et al. |
| 2009/0199264 A1 | 8/2009 | Lang |
| 2009/0210241 A1 | 8/2009 | Calloway |
| 2009/0234775 A1 | 9/2009 | Whitney et al. |
| 2009/0240624 A1* | 9/2009 | James et al. .................... 705/44 |
| 2009/0248573 A1 | 10/2009 | Haggerty et al. |
| 2009/0254476 A1 | 10/2009 | Sharma et al. |
| 2009/0260064 A1 | 10/2009 | Mcdowell et al. |
| 2009/0307778 A1 | 12/2009 | Mardikar |
| 2009/0328173 A1 | 12/2009 | Jakobson et al. |
| 2010/0011428 A1 | 1/2010 | Atwood et al. |
| 2010/0023448 A1 | 1/2010 | Eze |
| 2010/0030677 A1 | 2/2010 | Melik-Aslanian et al. |
| 2010/0043055 A1 | 2/2010 | Baumgart |
| 2010/0100945 A1 | 4/2010 | Ozzie et al. |
| 2010/0114724 A1 | 5/2010 | Ghosh et al. |
| 2010/0114744 A1 | 5/2010 | Gonen |
| 2010/0114747 A1 | 5/2010 | Kasower |
| 2010/0114776 A1 | 5/2010 | Weller et al. |
| 2010/0145840 A1 | 6/2010 | Kasower |
| 2010/0153278 A1 | 6/2010 | Farsedakis |
| 2010/0179906 A1 | 7/2010 | Hawkes |
| 2010/0205662 A1 | 8/2010 | Ibrahim et al. |
| 2010/0229245 A1 | 9/2010 | Singhal |
| 2010/0241535 A1 | 9/2010 | Nightengale et al. |
| 2010/0250411 A1 | 9/2010 | Ogrodski |
| 2010/0250497 A1 | 9/2010 | Redlich et al. |
| 2010/0257102 A1* | 10/2010 | Perlman .................... 705/75 |
| 2010/0280914 A1 | 11/2010 | Carlson |
| 2010/0299262 A1 | 11/2010 | Handler |
| 2010/0325048 A1 | 12/2010 | Carlson et al. |
| 2010/0325694 A1 | 12/2010 | Bhagavatula et al. |
| 2010/0332393 A1 | 12/2010 | Weller et al. |
| 2011/0016533 A1 | 1/2011 | Zeigler et al. |
| 2011/0029388 A1 | 2/2011 | Kendall et al. |
| 2011/0035788 A1 | 2/2011 | White et al. |
| 2011/0040629 A1 | 2/2011 | Chiu et al. |
| 2011/0071950 A1 | 3/2011 | Ivanovic |
| 2011/0137760 A1 | 6/2011 | Rudie et al. |
| 2011/0166988 A1 | 7/2011 | Coulter |
| 2011/0270618 A1 | 11/2011 | Banerjee et al. |
| 2012/0016948 A1 | 1/2012 | Sinha |
| 2012/0022990 A1 | 1/2012 | Kasower |
| 2012/0047219 A1 | 2/2012 | Feng et al. |
| 2012/0110677 A1 | 5/2012 | Abendroth et al. |
| 2012/0124498 A1 | 5/2012 | Santoro et al. |
| 2012/0136763 A1 | 5/2012 | Megdal et al. |
| 2012/0158574 A1 | 6/2012 | Brunzell et al. |
| 2012/0173339 A1 | 7/2012 | Flynt et al. |
| 2012/0216125 A1 | 8/2012 | Pierce |
| 2012/0265607 A1 | 10/2012 | Belwadi |
| 2012/0323954 A1 | 12/2012 | Bonalle et al. |
| 2013/0018811 A1 | 1/2013 | Britti et al. |
| 2013/0031624 A1 | 1/2013 | Britti et al. |
| 2013/0110557 A1 | 5/2013 | Kasower |
| 2013/0124392 A1 | 5/2013 | Achanta et al. |
| 2013/0205135 A1* | 8/2013 | Lutz .................... 713/165 |
| 2013/0339249 A1* | 12/2013 | Weller et al. .................... 705/44 |
| 2014/0061302 A1* | 3/2014 | Hammad .................... 235/382 |
| 2014/0110477 A1* | 4/2014 | Hammad .................... 235/382 |

FOREIGN PATENT DOCUMENTS

| | | |
|---|---|---|
| EP | 1 077 419 | 2/2001 |
| EP | 2 088 743 | 8/2009 |
| GB | 2 102 606 | 2/1983 |
| KR | 10-2004-0078798 | 9/2004 |
| WO | WO 91/16691 | 10/1991 |
| WO | WO 99/60481 | 11/1999 |
| WO | WO 00/30045 | 5/2000 |
| WO | WO 01/84281 | 11/2001 |
| WO | WO 2010/062537 | 6/2010 |
| WO | WO 2010/150251 | 12/2010 |
| WO | WO 2011/005876 | 1/2011 |
| WO | WO 2013/009920 | 1/2013 |

OTHER PUBLICATIONS

U.S. Appl. No. 12/705,511, filed Feb. 12, 2010, Bargoli et al.

"Aggregate and Analyze Social Media Content: Gain Faster and Broader Insight to Market Sentiment", SAP Partner, Mantis Technology Group, Apr. 2011, pp. 4.

BackupBox, http://mybackupbox.com printed Feb. 8, 2013 in 2 pages.

BlueCava, "What We Do", http://www.bluecava.com/what-we-do/, printed Nov. 5, 2012 in 3 pages.

Chores & Allowances. "Do Kids Have Credit Reports?", Oct. 15, 2007, http://choresandallowances.blogspot.com/2007/10/do-kids-have-credit-reports.html, pp. 5.

"Consumers Gain Immediate and Full Access to Credit Score Used by Majority of U.S. Lenders." PR Newswire, ProQuest Copy; Mar. 19, 2001; p. 1.

Ettorre, Paul Kahn on Exceptional Marketing, Management Review, vol. 38(11), Nov. 1994, pp. 48-51.

Expensr.com http://www.expensr.com/, as retrieved on Sep. 17, 2008.

Gibbs, Adrienne; "Protecting Your Children from Identity Theft," Nov. 25, 2008, http://www.creditcards.com/credit-card-news/identity-ID-theft-and-kids-children-1282.php, pp. 4.

Hojoki, http://hojoki.com printed Feb. 8, 2013 in 5 pages.

Hoofnagle, Chris Jay, "Identity Theft: Making the Known Unknowns Known," Harvard Journal of Law & Technology, Fall 2007, vol. 21, No. 1, pp. 98-122.

(56) References Cited

OTHER PUBLICATIONS

ID Theft Assist, "Do You Know Where Your Child's Credit Is?" Nov. 26, 2007, http://www.idtheftassist.com/pages/story14, pp. 3.

Ideon, Credit-Card Registry that Bellyflopped this Year, Is Drawing some Bottom-Fishers, The Wall Street Journal, Aug. 21, 1995, pp. C2.

IFTTT, "About IFTTT", http://ifttt.com/wtf printed Feb. 18, 2013 in 4 pages.

Iovation, Device Identification & Device Fingerprinting, http://www.iovation.com/risk-management/device-identification printed Nov. 5, 2012 in 6 pages.

Leskovec, Jure, "Social Media Analytics: Tracking, Modeling and Predicting the Flow of Information through Networks", WWW 2011-Tutorial, Mar. 28-Apr. 1, 2011, Hyderabad, India, pp. 277-278.

Li et al., "Automatic Verbal Information Verification for User Authentication", IEEE Transactions on Speech and Audio Processing, vol. 8, No. 5, Sep. 2000, pp. 585-596.

LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.

LifeLock, Various Pages, www.lifelock.com/, 2007.

Magid, Lawrence, J., Business Tools: When Selecting an ASP Ensure Data Mobility, Los Angeles Times, Los Angeles, CA, Feb. 26, 2001, vol. C, Issue 4, pp. 3.

Mover, "One API for the Cloud", http://mover.io printed Feb. 6, 2013 in 3 pages.

Ogg, Erica, "Apple Cracks Down on UDID Use", http://gigaom.com/apple/apple-cracks-down-on-udid-use/ printed Nov. 5, 2012 in 5 Pages.

Otixo, "Your Dashboard for the Cloud", http://Otixo.com/product printed Feb. 6, 2013 in 3 pages.

Pipes, http://pipes.yahoo.com/pipes printed Feb. 18, 2013 in 1 page.

Primadesk, http://primadesk.com printed Feb. 8, 2013 in 1 page.

Ramaswamy, Vinita M., Identity-Theft Toolkit, The CPA Journal, Oct. 1, 2006, vol. 76, Issue 10, pp. 66-70.

Storage Made Easy(SME), http://storagemadeeasy.com printed Feb. 6, 2013 in 1 page.

Vamosi, Robert, "How to Handle ID Fraud's Youngest Victims," Nov. 21, 2008, http://news.cnet.com/8301-10789_3-10105303-57.html.

Zapier, "Integrate Your Web Services", http://www.Zapier.com, printed Feb. 18, 2013 in 3 pages.

International Search Report and Written Opinion for Application No. PCT/US2012/046316, dated Sep. 28, 2012.

International Search Report and Written Opinion for Application No. PCT/US10/34434, dated Jun. 23, 2010.

Provisional Application as filed in U.S. Appl. No. 60/168,273, dated Dec. 1, 1999 in 21 pages.

* cited by examiner

ALWAYS ON AUTHENTICATION

CROSS-REFERENCE TO RELATED APPLICATIONS

This application claims the benefit of priority under 35 U.S.C. §119(e) of U.S. Provisional Application No. 61/730,698, filed Nov. 28, 2012, the disclosure of which is hereby incorporated by reference in its entirety.

BACKGROUND

Individuals frequently use a variety of electronic devices to access the Internet, conduct transactions online, and engage in various online activities, such as social networking. The corresponding increase in connectivity has improved the ease and convenience with which individuals can conduct transactions online and engage in various online activities. These transactions and activities often have security and/or authentication measures or requirements in order to protect the individual's identity and/or prevent fraud. Whether and when an individual is asked for authentication information, such as a username and/or password, can vary greatly depending on the transaction, activity, and even the device used to conduct the transaction or activity. Consequently, inconsistent security measures can create greater potential for undetected device usage or even fraudulent activity, and contribute to a lesser user experience as individuals may be prompted for additional security information at varying times.

SUMMARY

Described herein is an Always-On Authentication ("AOA") system that comprises a computer system, such as a server, that automatically monitors and authenticates an individual's online transactions and/or activities. The AOA system may be useful, for example, to detect and prevent fraud. As stated above, the level of security and/or authentication measures required or recommended can vary depending on the transaction or activity. Some transactions or activities may require a high level of authentication before an individual can proceed. For example, logging into an online financial account (such as a bank or credit card account) typically requires multiple levels of authentication such as a password, confirmation of an account-specific image associated with an individual's account or login information, last four digits of a social security number associated with the individual's account, and/or other various security requirements. Some activities may require a medium or low level of authentication before an individual can proceed. For example, an individual typically must enter an account password prior to placing an order for a product or service from an online service provider ("OSP"), even if the individual may have already "logged in" to the service provider's system. Some activities may not require any authentication before an individual can proceed. For example, conducting an online search or reading a news article are activities which typically do not require an individual to provide account information (for example, username and/or password).

An Always-on-Authentication system attempts to improve the individual's security and overall user experience by providing a system which actively monitors and/or authenticates an individual's online transactions and/or activities in "real time" or near real-time. According to one embodiment, an individual may initially authenticate his/her identity with the AOA system, for example during an enrollment or registration process. To initially authenticate his/her identity an individual may provide various personally identifying information, such as name, address, social security number, etc. The AOA system may then use the personally identifying information to initially authenticate and/or verify the individual's identity by accessing, for example, credit bureau data and/or consumer data.

Once the individual has been initially authenticated, the individual can then conduct transactions and/or engage in activities online with various OSPs. During the course of the individual's activities, an OSP may receive from the individual a portion of his/her identifying information (for example, the individual may register an account with the OSP, the OSP may access a cookie associated with the individual and/or his/her devices, etc.). For some transactions or activities, the OSP may determine that further authentication is necessary before the individual may be allowed to proceed. Traditionally, the OSP may require further authentication of the individual by requesting additional personally identifying information from the individual (for example, a password). In some embodiments involving an AOA system, the OSP may request further authentication of the individual from the AOA system. To do so, the OSP may provide the AOA system with some or all of a portion of the individual's identifying information. In some embodiments the AOA system may also receive information about the transaction or activity to be authenticated. The AOA system may then use the received information to authenticate the individual and/or the transaction. For example, in one embodiment, the AOA may access internal data (for example, an account and/or risk profile associated with the individual) and/or external data (for example, credit and/or consumer data sources). The AOA system may then provide a response to the OSP indicating, for example, whether the individual and/or the transaction has been authenticated, or whether further authentication may be recommended or required. Thus, an individual may be authenticated by the AOA system in some situations wherein the OSP would need to obtain further authentication information from the individual in order to authenticate the individual.

In one embodiment, the AOA system may be configured to store and access an individual risk profile associated with an individual. The risk profile may comprise, for example, information about particular transactions or activities known to be conducted or engaged in by the individual on a recurring basis. The risk profile may also comprise one or more risk indicators, which may indicate that particular transactions or activities may be, for example, "low risk," "medium risk," or "high risk." Risk indicators may be based on any other scale, such as percentage, A-F, 1-10, and the like.

The risk profile may also comprise information about behavioral patterns associated with the individual, including a record of historical transactions for the individual. The behavioral patterns may be based on the individual's behavior and/or may be based on behavioral patterns of one or more types of individuals which may be similar to the individual. Behavioral patterns may include, for example, information about which websites and/or services an individual visits and how frequently, the times at which the individual usually visits a website and/or service, information about one or more device(s) the individual uses to access the websites and/or services, and the like. The risk profile may also include information related to transactions or activities, such as a type of transaction, a location, a date, a time, or a computing device used for a transaction or activity.

In some embodiments, a threshold trust level for a transaction or activity may be determined at least in part by analyzing the frequency of historical transactions for the individual. For example, a threshold trust level for a transaction or activity may be low for transactions or activities the individual conducts frequently, such as browsing a favorite website, checking an email account, and the like. In another example, a threshold trust level for a transaction or activity may be higher for transactions or activities the individual conducts infrequently, such as logging into a bank account online, making a purchase at a new or previously unvisited website, and the like. Over time the threshold trust level for a transaction or activity may be adjusted up or down depending on how often the individual engages in the transaction or activity, (for example, the threshold trust level associated with browsing a favorite website may increase over time if the individual does not browse the favorite website for a length of time; or the threshold trust level associated with making a purchase at the new or previously unvisited website may decrease over time if the individual continues to shop at the website on a more regular basis).

Behavioral patterns may also track the individual's activities and interactions over time to provide additional insight into expected behavior versus unexpected behavior. Some transactions or activities falling outside of an expected behavior pattern may generate a higher risk indicator and/or require further authentication before an individual can proceed. For example, suppose an individual is browsing an online product catalog. The individual's corresponding behavioral pattern may indicate the individual has accessed several different pages of the online product catalog website. If, in a subsequent activity during the same browsing session, the individual switches to browsing a different website which the individual has not previously accessed, the activity may be flagged or identified as potentially higher risk because it is "outside" of the individual's normal or expected browsing behavior. Thus, the AOA system may provide an indication that this "new" activity may have a higher risk rating and recommend or require the website to obtain additional authentication from the individual. Once the individual provides the required additional authentication, the AOA system may update the individual's behavioral pattern and/or risk profile to indicate the particular activity is trusted. When the individual next visits the "new" website, the AOA system may recognize the activity as trusted, and the individual may not need to be prompted for further authentication again.

The AOA system may use the risk profile information to authenticate transactions or activities which match or are otherwise consistent with the risk profile. The risk profile may also be updated by the AOA system as the individual conducts transactions or activities over time. Thus, behavioral patterns for the individual may change over time and the risk profile may be updated correspondingly. Any risk indicators associated with the risk profile may also be updated over time. Various combinations of risk profile information (for example, user, device, type of activity, time of activity, etc.) may be used to either authenticate the individual or transaction, or to indicate that further authentication may be necessary or recommended. In some embodiments, The individual risk profile may be accessed by the AOA system to assess the risk of a transaction or activity, and to authenticate the individual and/or transaction or activity. For example, a risk profile for John Doe may indicate that John Doe regularly checks a social network account at a particular time each day from his tablet PC. The risk profile may include a risk indicator to indicate that this type of activity is "low risk" for John Doe. The AOA system may use this risk profile information to authenticate John Doe when he accesses his social network account at or near the specified time using his tablet PC. The AOA system may also use this risk profile information to require further authentication when John Doe accesses his social network account at or near the specified time, instead using his smart phone.

In one embodiment, the AOA system may be configured to store and access an OSP risk profile which may be associated with an online service provider. For example, an OSP may want to enable always-on authentication services for one or more activities (for example, logging in, viewing an article, viewing an item detail page, commenting on a web page, online shopping activities (e.g., adding items to an online shopping cart, checking out, placing an order), changing an address, changing a username and/or password, adding or deleting a credit card, accessing private information, etc.) associated with the online service. Further, the OSP may want to indicate that certain activities may have an associated risk level. Thus, for example, an OSP may want to enable always-on authentication for certain activities such as secured transactions, and indicate a risk level which may trigger the AOA system to identify the transaction as potentially higher risk (and thus, require further authentication). The AOA system may also be configured to receive, process, and store custom activity authentication templates or settings provided by the OSP. The OSP risk profile may be configured to store all of the above settings, which may then be accessed by the AOA system for use during the authentication processes described herein.

In one embodiment, the AOA system may be configured to operate in conjunction with a virtual credential ("VC") which is provided to an individual and/or the individual's devices. A virtual credential can comprise a cookie, a digital certificate, or some other digital authentication used to uniquely and securely identify and/or authenticate the individual's identity. In some embodiments the VC may be encrypted for the individual and/or for the individual's device. The VC may be associated with an individual and one or more of the individual's devices. In some embodiments the VC may be associated with an individual risk profile. In one embodiment, the VC may be provided to the OSP from the individual and/or device when the individual conducts a transaction or activity. The VC may then be received by the AOA system from the OSP when the OSP requests authentication of the individual, transaction, and/or activity. The AOA system can then look up the VC, for example in an internal data source storing VCs provided to individuals and/or devices, to determine whether it is associated with the individual or device. In some embodiments the VC may also be used to access the individual risk profile for the individual, which may in turn be used to assess the risk of the transaction or activity as described herein.

In one embodiment, the AOA system may be configured to monitor transactions and/or activities for usage of certain information and/or devices associated with an individual. For example, the AOA system may receive from an individual a request to monitor one or more items of personal information (for example, name, address(es), phone number(s), date of birth, social security number, email address(es), etc.). The risk profile for the individual may then be updated to include the items to be monitored. The AOA system may then actively monitor and/or authenticate transactions and/or activities for the individual which may access, use, or otherwise be related to the items to be monitored.

In some embodiments, the AOA system may be configured to generate and provide alerts to the individual when a transaction or activity has been flagged as potentially high risk and/or requiring further authentication. In some embodiments the individual can indicate whether he/she wishes to receive these alerts, and/or specify that alerts only be provided for transactions and/or activities identified above a certain risk level (e.g., only send me alerts for transactions identified as high-risk" or the like). Each alert may provide, for example, information about the date and time of a particular transaction, information about the device used for the transaction, the originating location, and the like. Alerts may be delivered, for example, via text, SMS, email, or some other real-time notification system. Alerts may be made available to the user via a standalone application or browser accessible dashboard user interface that the user can view at his/her convenience. In some embodiments alerts may be text-based, while in some embodiments alerts may include a user interface generated by the AOA system.

In some embodiments, the monitoring and/or authentication performed by the AOA system is performed as a "background" or "behind the scenes" process which is "invisible" or "seamless" to the individual. For example, a transaction or activity may be referred from an online service provider to one embodiment of an AOA system, which may authenticate the transaction or activity without requiring any additional information from the individual. This may improve the individual's user experience by streamlining the authentication process.

As described herein, a transaction may comprise, for example, commercial and/or financial transactions (for example, making a purchase), as well as online interactions between an individual and an OSP, including a hypertext transfer protocol request. In some embodiments a transaction may be an activity and/or include an activity, such as an activity performed by an individual. Further, as described herein, an activity performed by an individual may comprise, for example, a particular step associated with a transaction (for example, browsing an online product catalog, adding an item to an online shopping cart, proceeding through a checkout process, placing an order, etc.); activities such as viewing and/or updating personal information (for example, address, credit card information, account username, account password, etc.); activities such as reading articles; activities such as receiving, reading, and/or sending e-mails or text messages; activities such as logging into and/or accessing a social networking website or service; and/or any other activity an individual may conduct via the Internet or network. In some embodiments, an activity may correspond to one or more of a "click," "touch," "swipe," "gesture," or user interaction with an element of web page. For example, an activity may correspond to an individual's clicking on or touching a button, link, or other user-selectable element of a web page, or to an individual's swipe or gesture with respect to a touch-enabled user interface, or other similar actions.

One embodiment may be a computer system comprising: a computing device in communication with a physical data store storing profile data for an individual, wherein the computing device is configured to: receive, from a user computing device, a request to authenticate an identity for an individual, wherein the request includes at least some personally identifying information for the individual; authenticate the identity of the individual, based on the personally identifying information for the individual and based on profile data for the individual accessed from the physical data store; issue, to the user computing device, a virtual credential for the individual; associate the virtual credential with the profile data for the individual; receive, from a requesting entity, a request to authenticate a transaction, wherein the request includes the virtual credential; access a risk profile associated with the profile data for the individual, wherein the profile data for the individual is accessed using the virtual credential; determine whether a level of trust for the transaction is below a threshold trust level, wherein the level of trust is based on an analysis of the risk profile and the transaction; and in response to a determination that the level of trust for the transaction is below the threshold trust level, provide an indication to the requesting entity that further authentication of the individual is recommended.

In another embodiment, the computing device is configured to update the risk profile to record information about the transaction in response to a determination that the level of trust for the transaction is not below the threshold trust level.

In another embodiment, the computing device is further configured to send an alert to the individual in response to a determination that the level of trust for the transaction is below the threshold level.

Some embodiments may comprise a computer-implemented method for authenticating a transaction for an individual, the computer-implemented method comprising: receiving, from a requesting entity, a request to authenticate a transaction for an individual, wherein the request includes a virtual credential, wherein the virtual credential was provided to the requesting entity from the individual; accessing a risk profile associated with profile data for the individual, wherein the profile data for the individual is accessed from a profile data store using the virtual credential; determining whether a level of trust for the transaction is below a threshold trust level, wherein the level of trust is based on an analysis of the risk profile and the transaction; and in response to a determination that the level of trust for the transaction is below the threshold trust level, providing an indication to the requesting entity that further authentication of the individual is recommended; or in response to a determination that the level of trust for the transaction is not below the threshold trust level, updating the risk profile to record information about the transaction.

In an embodiment, the computer-implemented method further comprises sending an alert to the individual in response to a determination that the level of trust for the transaction is below the threshold level.

In an embodiment, the computer-implemented method further comprises updating the risk profile to record information about the transaction in response to a determination that the level of trust for the transaction is not below the threshold trust level.

Another embodiment may be a non-transitory computer storage having stored thereon a computer program, the computer program including modules configured for execution by a computing system and including at least: an individual authentication module configured to: receive, from a user computing device, a request to authenticate an identity for an individual, wherein the request includes at least some personally identifying information for the individual; authenticate the identity of the individual, based on the personally identifying information for the individual and based on profile data for the individual accessed from the physical data store; issue, to the user computing device, a virtual credential for the individual; associate the virtual credential with the profile data for the individual; a risk assessment module configured to: receive, from a requesting entity, a request to authenticate a transaction, wherein the request includes the virtual credential; access a risk profile associated with the profile data for the individual, wherein the profile data for the individual is accessed using the virtual credential; determine whether a level of trust for the transaction is below a threshold trust level, wherein the level of trust is based on an analysis of the risk profile and the transaction; and in response to a determination that the level of trust for the transaction is below the threshold trust level, provide an indication to the requesting entity that further authentication of the individual is recommended.

In another embodiment, the risk profile includes a mapping of one or more transaction types and respective one or more threshold trust levels.

In another embodiment, the risk profile includes a record of historical transactions for the individual, and wherein the threshold trust level is determined at least in part by analyzing the frequency of historical transactions for the individual.

In another embodiment, the transaction is one of a financial transaction, an online interaction between the individual and the requesting entity, a hypertext transfer protocol request, or an activity.

In another embodiment, the virtual credential includes a unique digital token, and wherein the virtual credential is associated with one or more computing devices for the individual.

In another embodiment, the level of trust and the threshold trust level are numeric ratings in the range of one to ten.

In another embodiment, the level of trust and the threshold trust level are risk ratings indicating a degree of risk associated with a transaction type.

As described herein, an online service provider ("OSP") may comprise, for example, websites, online services, mobile web applications, network services, and the like

DETAILED DESCRIPTION

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

High Level Data Flows

Figure 1A:
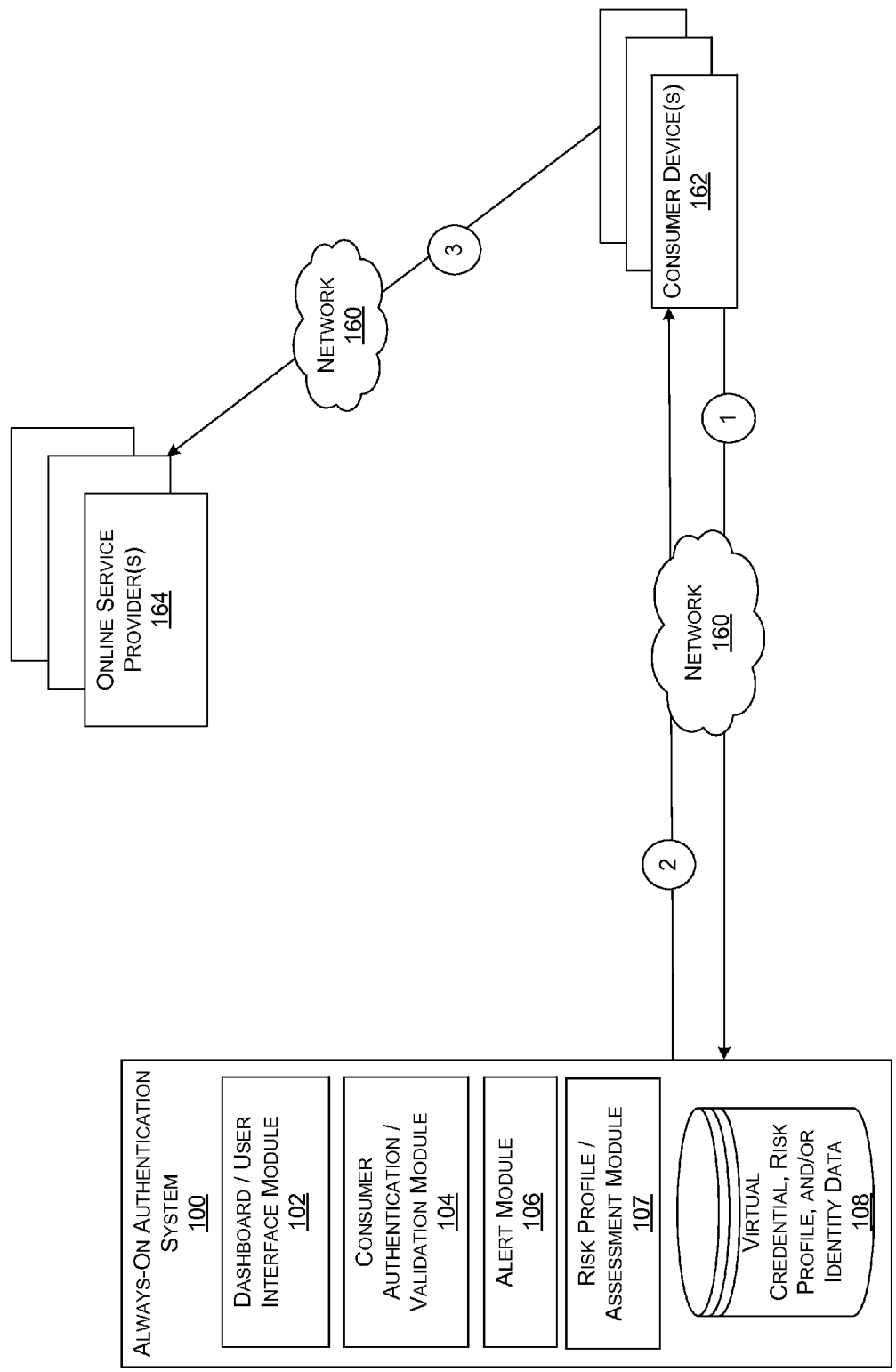
FIG. 1A is a block diagram which illustrates an exemplary data flow between one or more consumer devices, service providers/retailers, and an always-on authentication system, according to one embodiment.

FIG. 1A is a block diagram which illustrates an exemplary data flow between one or more consumer devices (e.g., computing devices) 162, online service providers ("OSPs") 164, and an Always-On Authentication ("AOA") system 100, according to one embodiment. In the data flow of FIG. 1A, one embodiment of the AOA system sets up or initializes the authentication monitoring for an individual. At step (1) the AOA system may authenticate a consumer or individual's identity ("ID"). For example the AOA system may receive identifying information from the individual, which the AOA system can use to initially authenticate the individual. During this step the AOA system may receive from the individual an indication of particular items of personal information the individual wants to have monitored, which the AOA system can use to generate an initial risk profile for the individual. At step (2), once the individual's identity has been authenticated, the AOA system 100 may generate and/or issue a virtual credential (VC) to the individual and/or consumer devices 162. At step (3), the individual then interacts with the OSPs 164, for example, over a network 160. During the course of these transactions and/or activities, the individual, via his/her consumer device, may provide the VC to OSPs 164. The OSPs 164 may then in turn use the VC to request further authentication from the AOA system of the individual's transactions and/or activities.

Figure 1B:
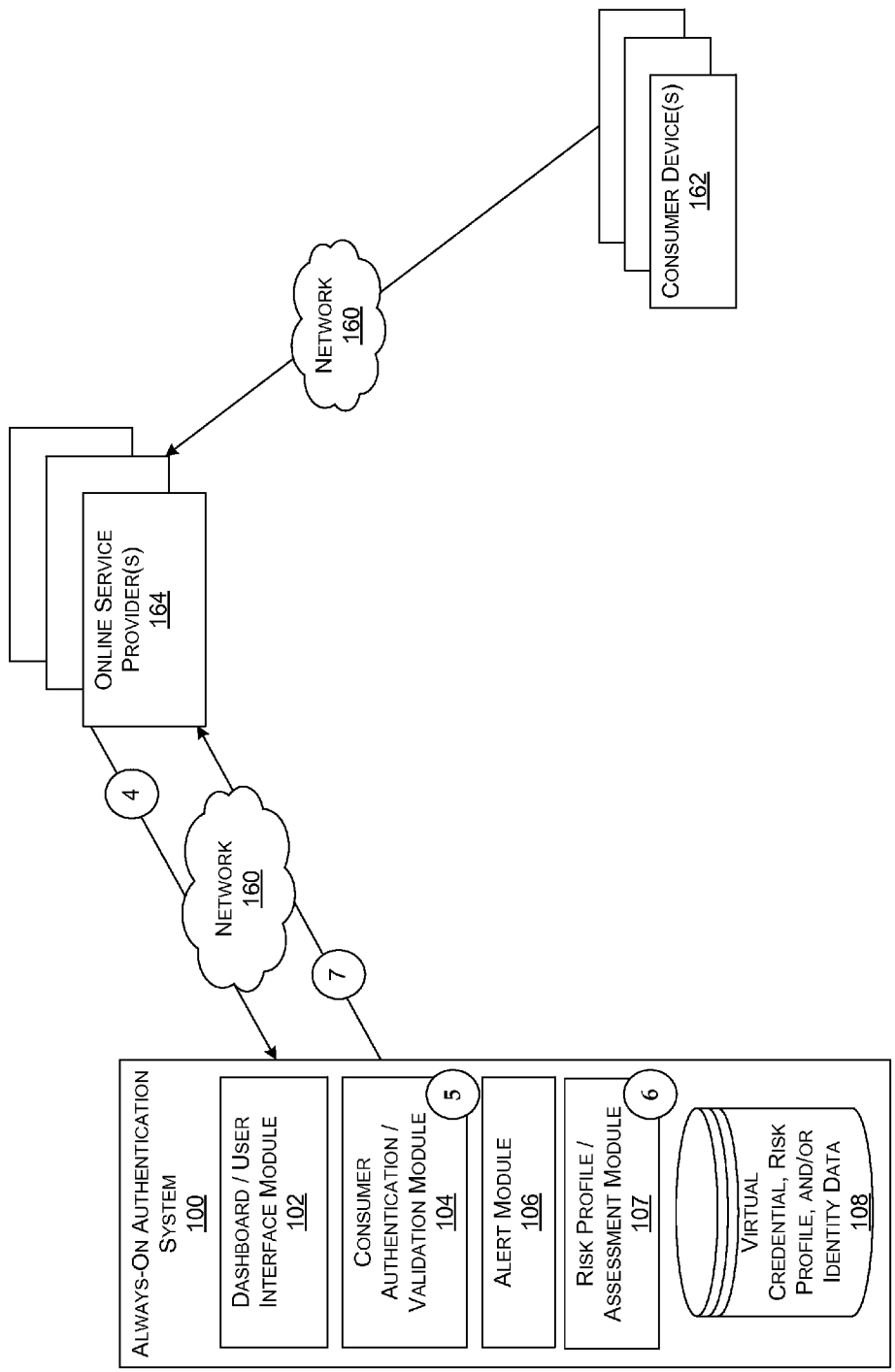
FIG. 1B is a block diagram which illustrates another exemplary data flow between one or more consumer devices, service providers/retailers, and an always on authentication system, according to one embodiment.

FIG. 1B is block diagram which illustrates another exemplary dataflow between the consumer devices 162, AOA system 100, and OSPs 164. This data flow continues from FIG. 1A, after the individual has completed the initial authentication process. At step (4) the AOA system receives from the OSPs 164 a request to validate, or authenticate, a transaction and/or activity associated with the individual and/or the VC as provided by the individual to the OSP 164. At step (5), the AOA system 100 attempts to authenticate the transaction and/or activity, and/or validate the virtual credential, for example, via a consumer authentication/validation module 104. At step (6) the AOA system may access a risk profile associated with the individual. The risk profile may be accessed from, for example, the virtual credential, risk profile, and/or identity data source 108. The AOA system may then use the risk profile to assess the risk level of the transaction and/or activity being referred from the OSPs 164. If the level of risk for the transaction and/or activity is determined to be a certain level, then at step (7) the system may provide an indication to the OSP 164 indicating whether the activity is trusted, or if additional authentication may be required to authenticate the user's identity. Although not shown in FIG.

1B, the AOA system may also send an alert to the individual if the level of risk for the transaction and/or activity is determined to be a certain level.

Figure 1C:
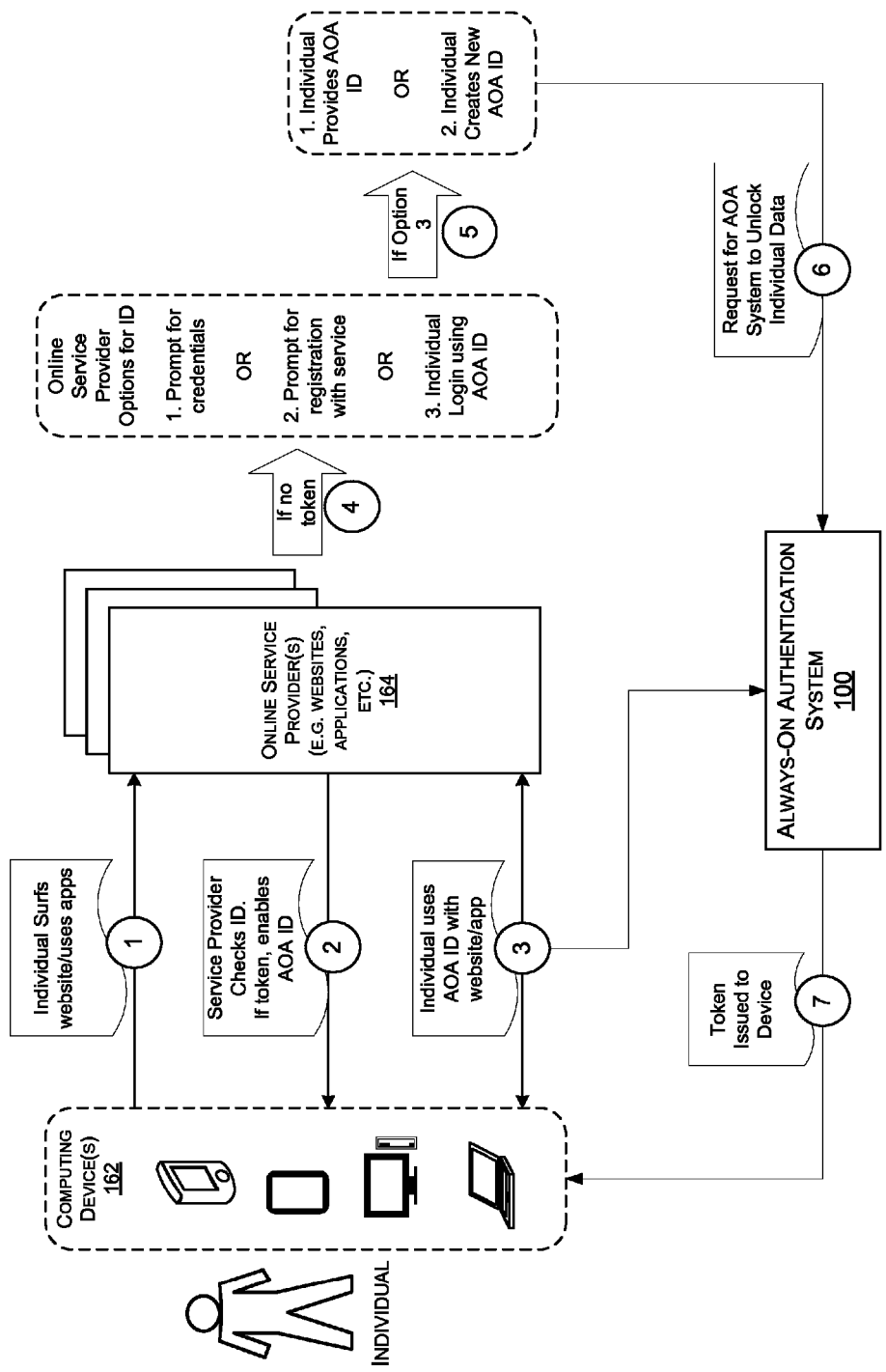
FIG. 1C is a block diagram which illustrates another exemplary data flow between one or more consumer devices, service providers/retailers, and an always on authentication system, according to one embodiment.

FIG. 1C is block diagram which illustrates another exemplary dataflow between an individual's consumer device(s) 162, AOA system 100, and OSPs 164. In the data flow of FIG. 1C, one embodiment of the AOA system sets up or initializes the authentication monitoring for an individual.

Beginning at step (1), a consumer or individual may interact with one or more OSPs 164, for example by surfing the web (e.g. the Internet or other network) or by using an application, or "app" (e.g. a web application, an application installed on the individual's consumer device(s) 162, and the like). During these interactions the individual may provide identity information (e.g. a name, a username, a digital identification, a virtual credential, a token, a cookie, a super-cookie, or any other type of identifier associated with the individual and/or the individual's consumer device(s) 162).

At step (2), a service provider (e.g. one of the one or more OSPs 164) may check the identity information provided by the individual. In some embodiments, the service provider checks if the individual has provided a token that is valid and associated with the individual, for example by sending a token validation request to the AOA system 100. The AOA system 100 may receive the token (and/or other identity information) and provide verification to the service provider that the token is valid and associated with the individual and/or enable an Always-On Authentication ("AOA") ID for the individual to the service provider. In some embodiments, the AOA ID may be, for example, a virtual credential. Once the service provider receives verification that the token is valid and associated with the individual, and/or the service provider receives notification from the AOA system that the AOA ID is enabled, the service provider may then authorize the individual's activity or transaction.

At step (3), the individual may then continue to interact with the service provider (and/or the one or more OSPs 164) using the AOA ID and/or the token. For each activity or transaction, the service provider may, but need not, submit additional requests to validate the token and/or the AOA ID to the AOA system, for example as additional security. For example, activities or transactions which the service provider has determined or identified as low-risk may not give rise to additional validation requests, while activities or transactions which the service provider has determined or identified as medium or high-risk for the particular individual, e.g., based on the browsing history of the individual, may give rise to additional validation requests.

In some embodiments, the individual may not provide a token to the service provider. For example, if the individual is using an unregistered computing device to access the service provider's website or application, the individual may not yet have a token associated with the unregistered computing device. Further, in some embodiments, the individual may provide an invalid token which the AOA system is unable to validate. For example, the individual may provide an invalid token which is not associated with the individual's account (as might be the case if the token is expired, deactivated, deauthorized, etc.) Thus, step (4) illustrates scenarios in which the individual has not provided a token to the service provider, or if the AOA system is unable to validate a token provided as described at step (2) above.

At step (4), the service provider may provide one or more options to the individual to provide identity information. FIG. 1C illustrates three options at step (4), however more options may be possible as well. According to the embodiment in FIG. 1C, at step (4) the service provider may prompt the individual for credentials (e.g. a username and a password associated with an account registered with the service provider); prompt the individual to register with the service provider (e.g. if the individual does not have an account registered with the service provider, and/or the individual may be prompted to login using an AOA ID.

If the third option is selected, then at step (5), the service provider may provide one or more options for the individual to login using an AOA ID. FIG. 1C illustrates two options at step (5), however more options may be possible as well. According to the embodiment in FIG. 1C, at step (5) the service provider may prompt the individual to provide an existing AOA ID associated with the individual's account, and/or prompt the individual to create a new AOA ID. In any event, the service provider submits the individual's request to the AOA system at step (6), which may then result in the AOA unlocking the individual's data. For example, the AOA system may validate the existing AOA ID, if provided, or create the new AOA ID for the individual, as the case may be. Some benefits of unlocking the individual's data, and/or enabling an existing AOA ID or a newly created AOA ID, may include, for example, accessing and providing consumer data from consumer data sources (e.g. virtual credential, risk profile, and/or identity data source 108, and/or data sources 166 described herein) to facilitate use of automatic-fill ("auto-fill") forms (e.g. web forms requesting input of individual profile data). Additionally, the AOA ID enables service providers to know or recognize their customers, which may facilitate the use of consumer profile data for personalization.

As described further herein, the AOA ID may be used on a per-transaction, interaction, or activity basis, and in some cases the individual may be prompted for additional information to authorize the transaction, interaction, or activity. In some embodiments the AOA ID may also enable the individual to receive alerts generated by the AOA system for transactions, interactions, or activities which may potentially be fraudulent or inconsistent with a recognized risk profile or pattern for the individual.

An AOA ID or a virtual credential may have one or more levels of associated data attributes for the individual. The one or more levels may correspond to different degrees of privacy and/or amount of data associated with the individual. For example, some levels may include basic, private, identity, payment, and/or marketing. Thus, basic level data attributes may include for example data which is publicly known about the individual, such as a name, address, phone number, date of birth, birthplace, etc. Private level data attributes may include for example data which is private or otherwise not publicly known about the individual, such as a credit report, personal finance information, credit information, healthcare information, and the like. Identity level information may include even more private data about the individual, such as a social security number, a driver's license identification number, or other secured form of identification. Payment level information may include, for example, data for one or more credit and/or debit cards for the individual (e.g. number, expiration, security code) which may be used, for example, by a service provider to enable automatic payment or facilitate online checkout processes and systems. Marketing level information may include, for example, marketing preferences for the individual, such as a medium of contact (e.g. email, phone, text or SMS, etc.), a frequency of contact (e.g. daily, weekly, monthly, etc.), type of information acceptable to contact the individual about (e.g. sales/coupons/promotions), and the like. In some embodiments of the AOA system, some or all of the data attributes associated with the AOA ID, including but not limited to the one or more levels described above, may be automatically generated and/or populated based on, for example, accessed consumer profile data (e.g. from a virtual credential, risk profile, and/or identity data source 108, and/or data sources 166 described herein) such as a credit report for the individual. In some embodiments of the AOA system, some or all of the data attributes associated with the AOA ID, including but not limited to the one or more levels described above, may be manually provided by the individual or by the service provider (e.g. on behalf of the individual).

At step (7), once the individual's data has been successfully unlocked (e.g. the existing AOA ID credentials are verified by the AOA system, or the new AOA ID is successfully created for the individual, etc.), the AOA system may issue a new token to the individual's consumer device(s) 162. The data flow may then return, for example, to step (3), where the individual may use the AOA ID, and/or token associated with the AOA ID and/or the consumer device(s) 162, for subsequent activities and/or transactions with the service provider (and/or the one or more OSPs 164).

In some embodiments, once the AOA ID has been provided or otherwise enabled for use for the individual, the individual may be charged a service fee for use of the AOA ID and the always-on authentication monitoring services. For example, the individual may pay a periodic fee (e.g. monthly, annually, etc.). Payment may be facilitated by automatically populating the AOA ID with payment information, for example from a credit report, as described herein. Individuals subscribing to the AOA service, as provided by the AOA systems and methods described herein, gain the benefit of full authentication during the course of their day-to-day transactions and interactions online.

Examples of Methods Performed by an Always-on Authentication System

Figure 2:
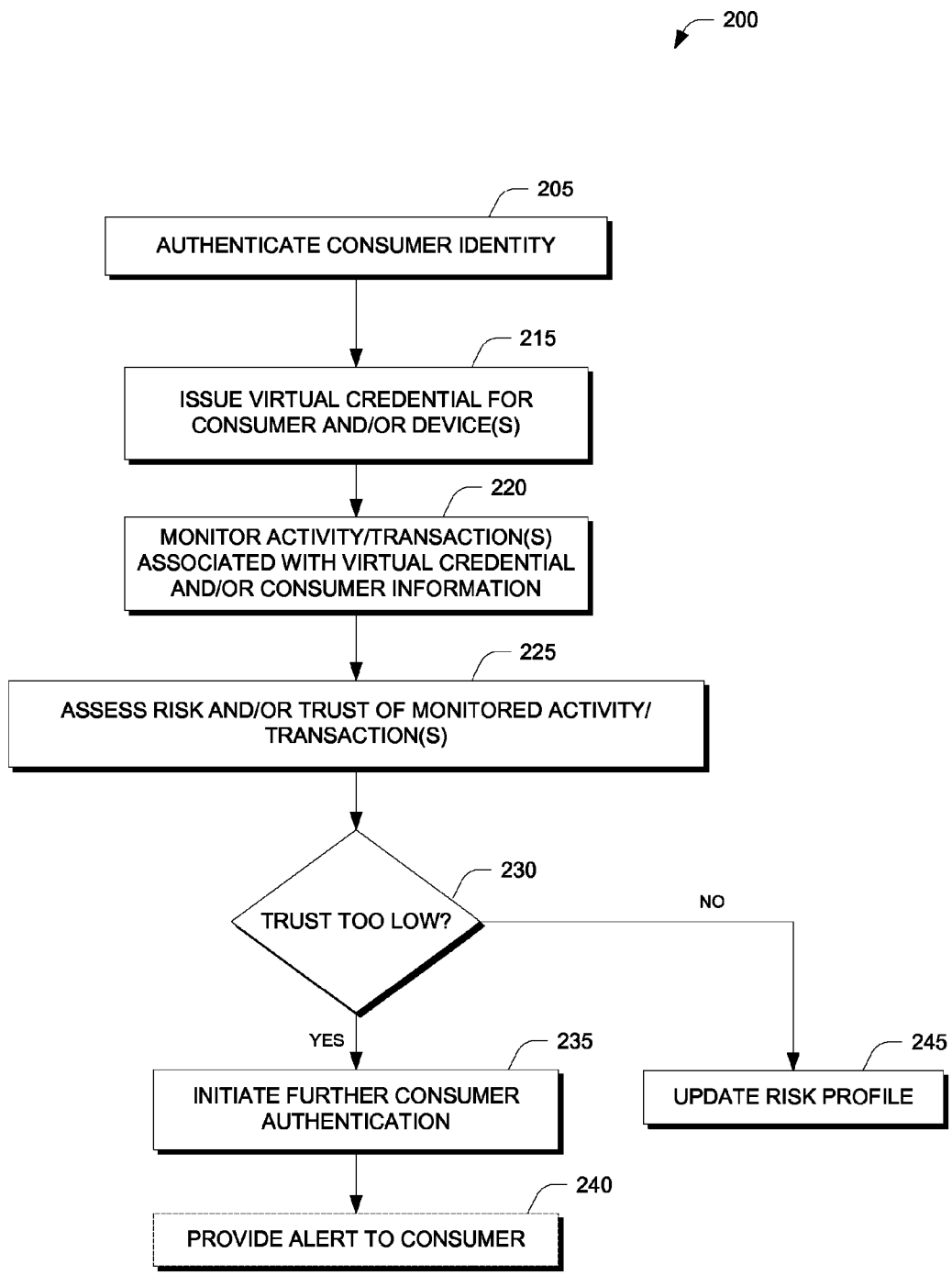
FIG. 2 is a logical flow diagram of a process for an individual to initially authenticate his/her identity and initiate monitoring of his/her transactions and/or activities involving an embodiment of an AOA system, such as the AOA system of FIG. 1A, FIG. 1B, FIG. 1C, and/or FIG. 9.
Figure 9:
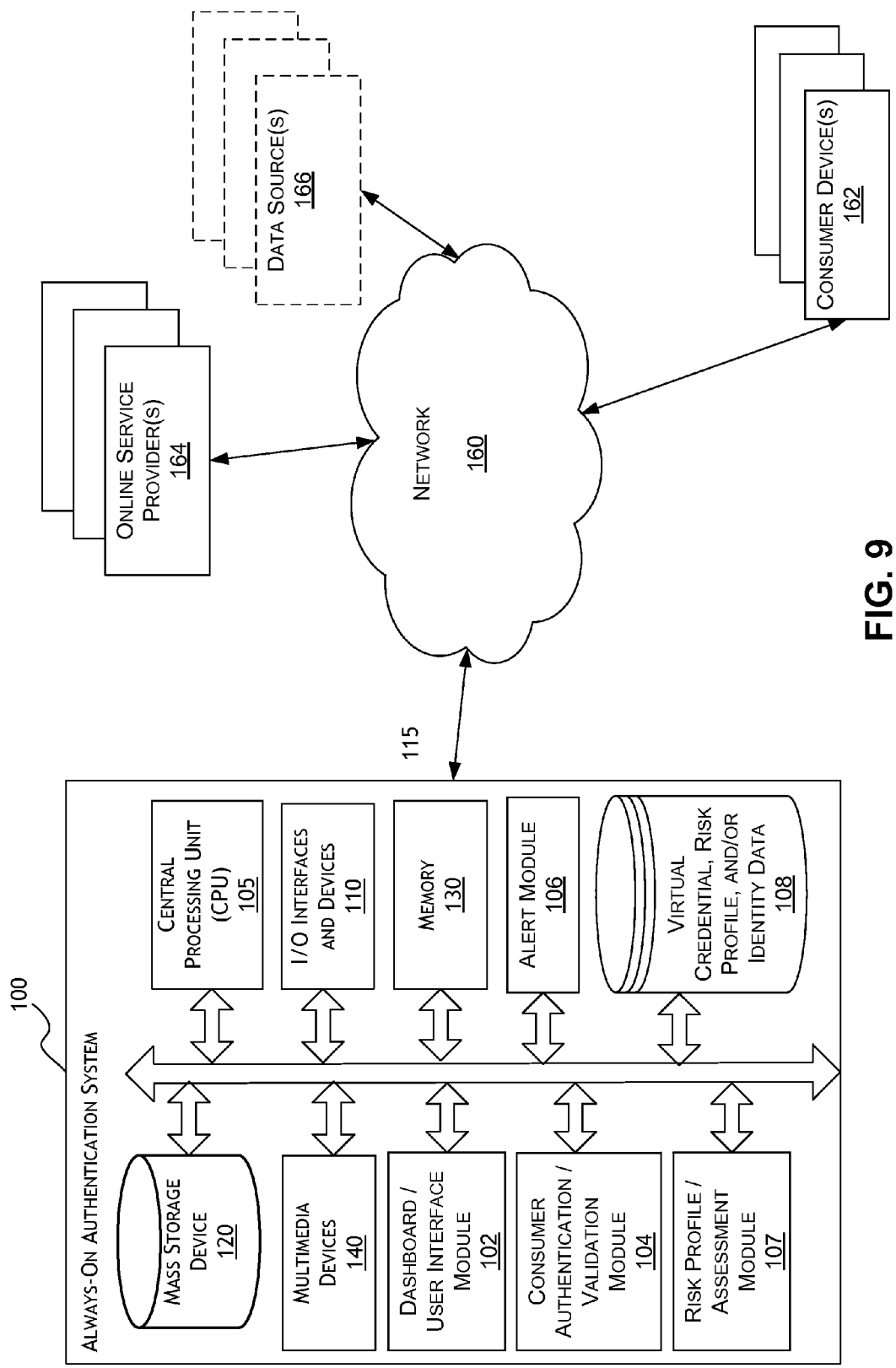
FIG. 9 is a block diagram showing an embodiment in which an always-on authentication computing system (or simply "computing system") is in communication with one or more networks, and various systems are also in communication with the one or more networks.

FIG. 2 is a logical flow diagram of a process 200 for an individual to initially authenticate his/her identity and initiate monitoring of his/her transactions and/or activities involving an embodiment of an AOA system, such as the AOA system 100 of FIG. 1A, FIG. 1B, FIG. 1C, and/or FIG. 9. Beginning at block 205, the AOA system 100 may initially authenticate the individual's identity. Next at block 215, the AOA system 100 can, after the individual's identity has been authenticated, issue a virtual credential for the individual and/or the individual's devices. The individual may associate this virtual credential with one or more of their own devices for use when they conduct transactions online, for example. Next at block 220, the AOA system can monitor the activity/transactions associated with the virtual credential and/or individual's information to identify potential fraud risk. Next at block 225, AOA system may assess the risk and/or trust level of the monitored activity and/or transactions. At block 230, the system determines whether or not the trust level is too low. In response to a determination that the trust level is too low, the system may proceed to block 235 where it may initiate further individual authentication. According to some embodiments, at block 240, the system may also provide an alert to the individual indicating that their identity may be associated with a potential risk. With respect once again to the determination made at block 230, in response to a determination that the trust level is not too low (e.g. the activity is trusted or the level of risk is minimal), the system may proceed to block 245 where it may update a risk profile associated with the individual. The risk profile associated with the individual may include information about certain activities and/or transactions which an individual conducts regularly, as well as risk ratings associated with the activities and/or transactions. At block 245 then, the risk profile may be updated to reflect, for example, that the particular activity and/or transaction authenticated by the process 200 is trusted or low-risk. Such information may be accessed, for example as shown in the process of FIG. 3, for future authentication requests, and used to develop behavioral trends for the individual over time.

Figure 3:
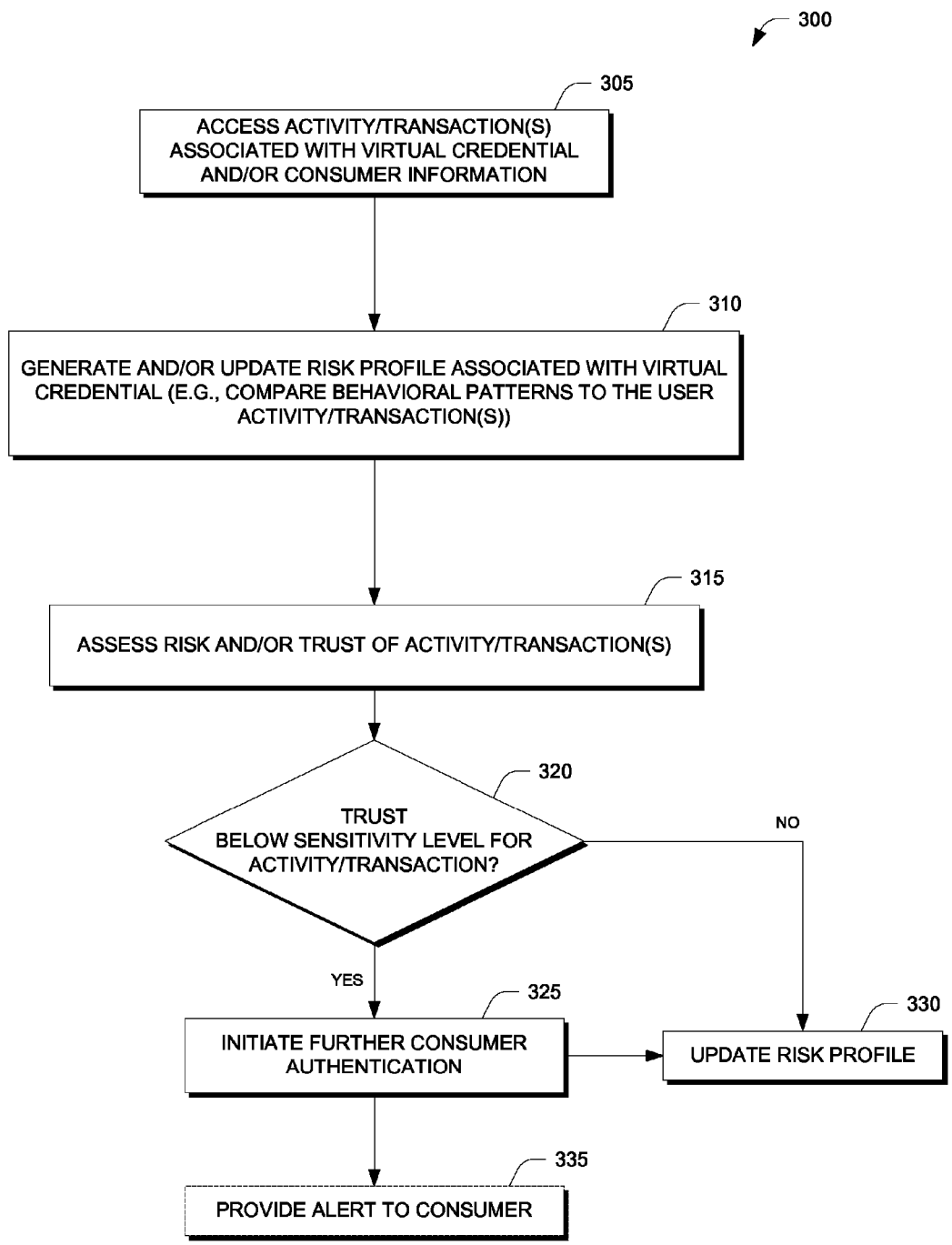
FIG. 3 is a logical flow diagram of a process for monitoring an individual's transactions and/or activities involving an embodiment of an AOA system, such as the AOA system of FIG. 1A, FIG. 1B, FIG. 1C, and/or FIG. 9.

FIG. 3 is a logical flow diagram of a process 300 for monitoring an individual's transactions and/or activities involving an embodiment of an AOA system, such as the system 100 of FIG. 1A, FIG. 1B, FIG. 1C, and/or FIG. 9. At block 305 the AOA system may access or receive transactions and/or activities associated with an individual. For example, in one embodiment the AOA system may receive a request to authenticate a transaction or activity from a requesting entity, such as an OSP. Here the AOA system may also receive a VC associated with the individual and/or his/her device, if the individual has been issued a VC. Next at block 310, the system may generate and/or update a risk profile associated with the VC. For example, the system may compare behavioral patterns associated with the risk profile to the user activity/transaction and identify whether or not the transactions and/or activities are consistent with the behavioral patterns associated with the risk profile. Next at block 315, the system may assess the risk and/or trust level of the transaction and/or activity. At block 320, the system determines whether the trust is below a certain sensitivity or threshold level for the transaction and/or activity. If the system determines that the trust level is below the sensitivity or threshold level for the transaction and/or activity, the system may proceed to block 325. At block 325 the system may initiate further individual authentication in order to authenticate the individual. At this point, the system may then proceed to block 330 and the risk profile associated with the virtual credential may be updated based on the assessed risk and/or trust level of the current activity or transaction. Alternatively, proceeding from block 320, if the system determines that the trust level is not below the sensitivity or threshold level for a certain activity or transaction, then the system may determine that the activity or transaction is trusted and simply update the risk profile at block 330 to reflect that the activity is a trusted activity. Finally, at block 335, the system may optionally provide an alert to the individual once the system determines that the current activity or transaction is below the certain trust level.

Examples of User Interfaces for an Always-on Authentication System

FIGS. 4, 5, 6, 7, and 8 illustrate several example user interfaces as used in one or more embodiments of an always-on authentication system, such as the AOA system 100 of FIG. 1A, FIG. 1B, FIG. 1C, and/or FIG. 9. The sample user interfaces may be displayed, for example, via a web browser or standalone application. However, in some embodiments, the sample user interfaces shown in FIGS. 4, 5, 6, 7, and 8 may also be displayed on a suitable computer device, such as a personal computer, desktop, laptop, cell/smart phone, tablet, or portable computing device, and are not limited to the samples as described herein. The user interfaces are examples of only certain features that an AOA system may provide. In other embodiments, additional features may be provided, and they may be provided using various different user interfaces and software code. Depending on the embodiment, the user interface and functionality described with reference to FIGS. 4, 5, 6, 7, and 8 may be provided by software executing on a computing device, by an AOA system located remotely that is in communication with the computing device via one or more networks, and/or some combination of software executing on the computing device and the address verification system.

Figure 4:
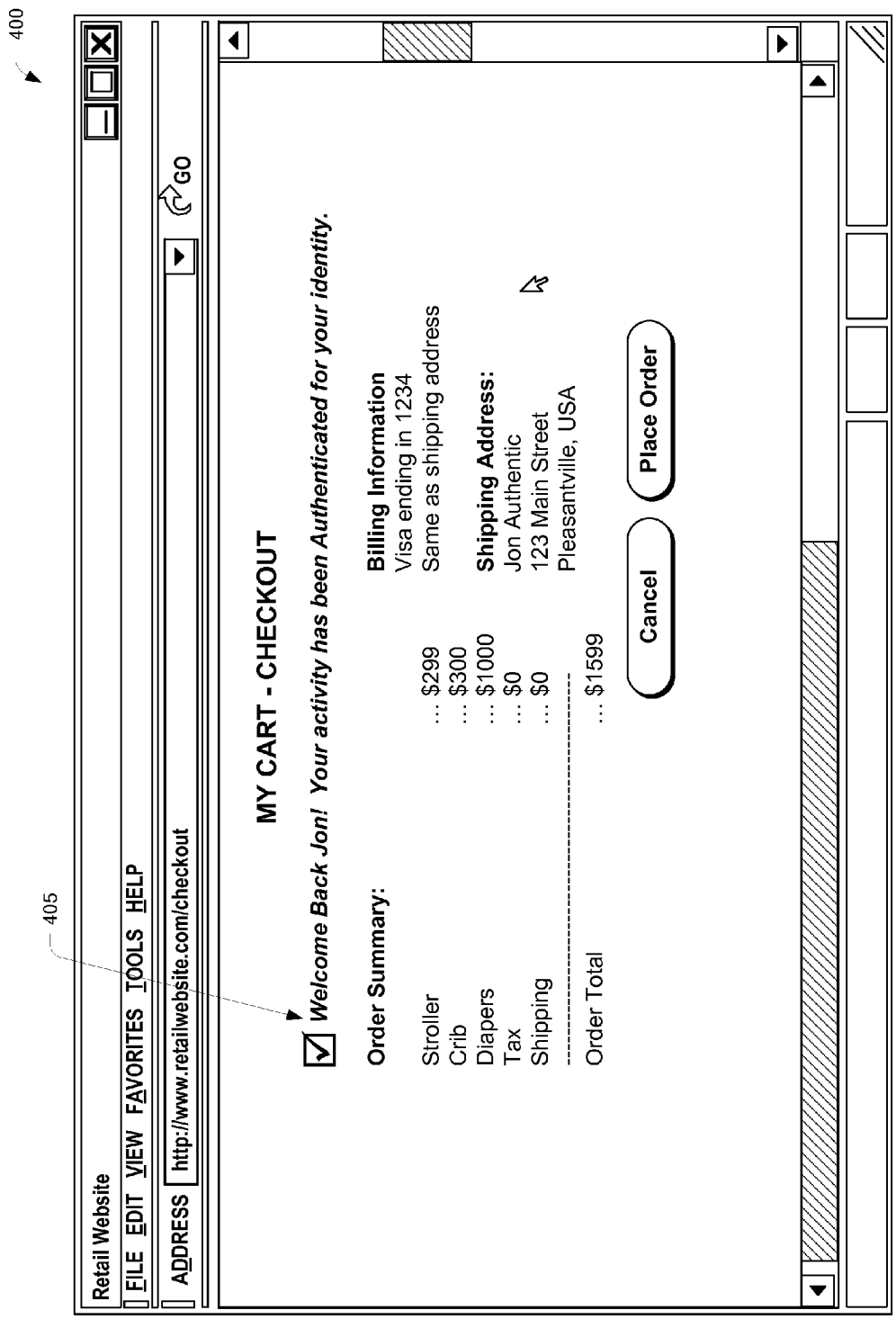
FIG. 4 illustrates an example interface of an online shopping website in which an individual's activity has been authenticated by an AOA system, such as the AOA system of FIG. 1A, FIG. 1B, FIG. 1C, and/or FIG. 9.

FIG. 4 illustrates an example interface 400 of an online shopping website in which an individual's activity has been authenticated by the AOA system. In one embodiment, the individual's activity may have been authenticated based on his/her virtual credential. As FIG. 4 illustrates, the particular individual, John, is presented a display message 405 indicating that his activity has been authenticated for his identity. This message may be displayed, for example, with respect to FIG. 4, at some point during a checkout process for an online shopping cart. In some embodiments, no message may be displayed at all and the individual (e.g. John) may enjoy a completely seamless user experience.

Figure 5:
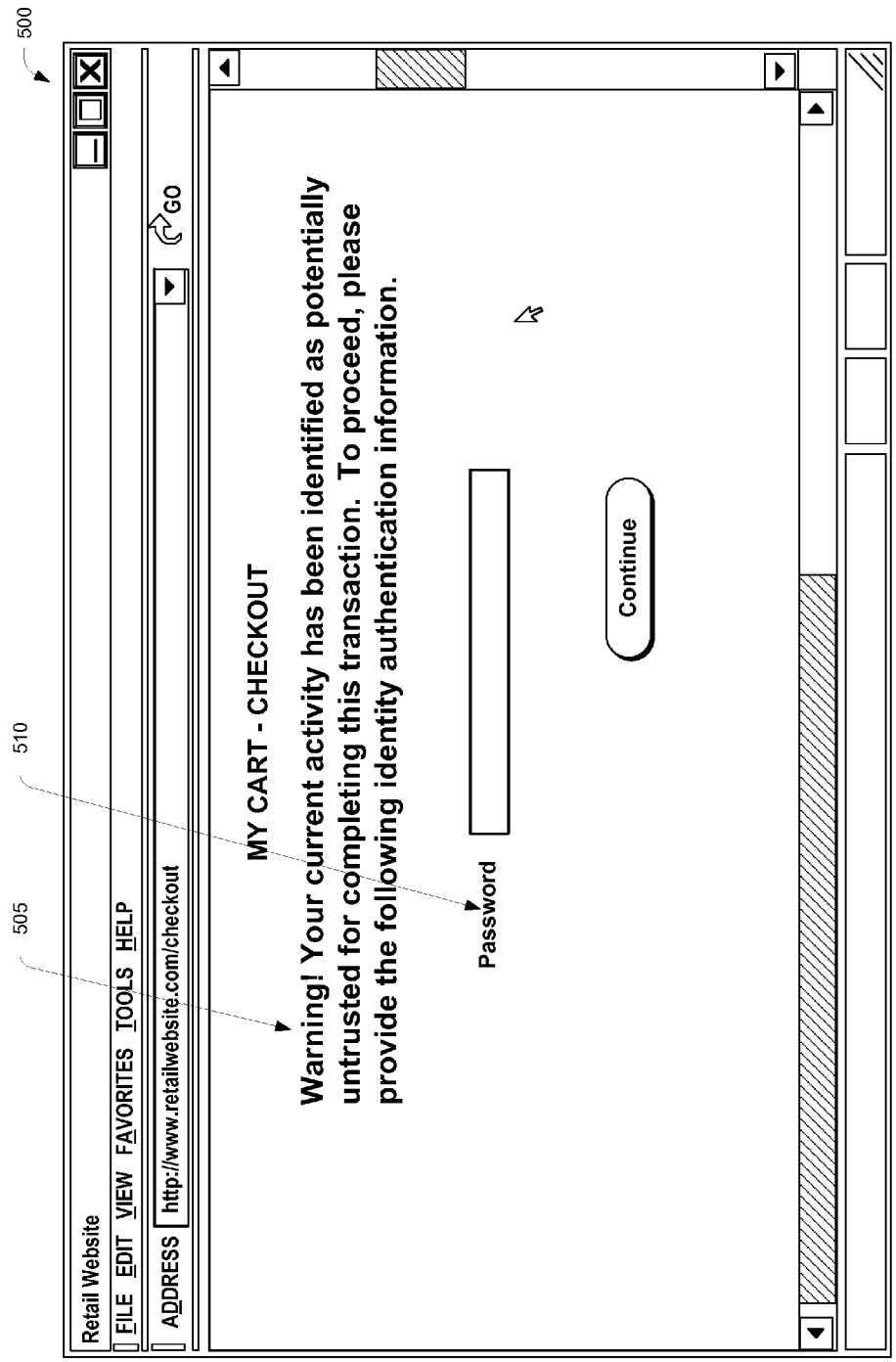
FIG. 5 illustrates another example user interface of an online checkout cart process using an AOA system, such as the AOA system of FIG. 1A, FIG. 1B, FIG. 1C, and/or FIG. 9.

FIG. 5 presents another example user interface 500 of an online checkout cart process. In this example the individual is being prompted for his or her password because the AOA system has identified the current activity as outside of the trust level required for completing the transaction. The AOA system may have determined this based on, for example, the individual risk profile, behavioral patterns for the individual associated with the individual risk profile, and/or the OSP risk profile. Thus, the AOA system may have provided an indication to the website that further authentication is recommended or required. According to a display message 505 shown in FIG. 5, to proceed further, the individual must provide additional identity authentication information. In this example, the additional identity authentication information being requested by the website is the individual's password 510. In other embodiments, additional information may be required. For example, out-of-wallet type questions which ask, for example, personal questions which only the individual may know the answer, such as the individual's make and model of their first car, the name of their first boy/girlfriend, where they were born, where they went to high school, the name of their favorite teacher in high school, and other types of personally identifying questions. Once the individual provides his or her password (or other identity authentication information that may be required), the individual can select the "continue" option as shown in FIG. 5. Once the individual's information is further authenticated the individual may proceed through the checkout process.

Figure 6:
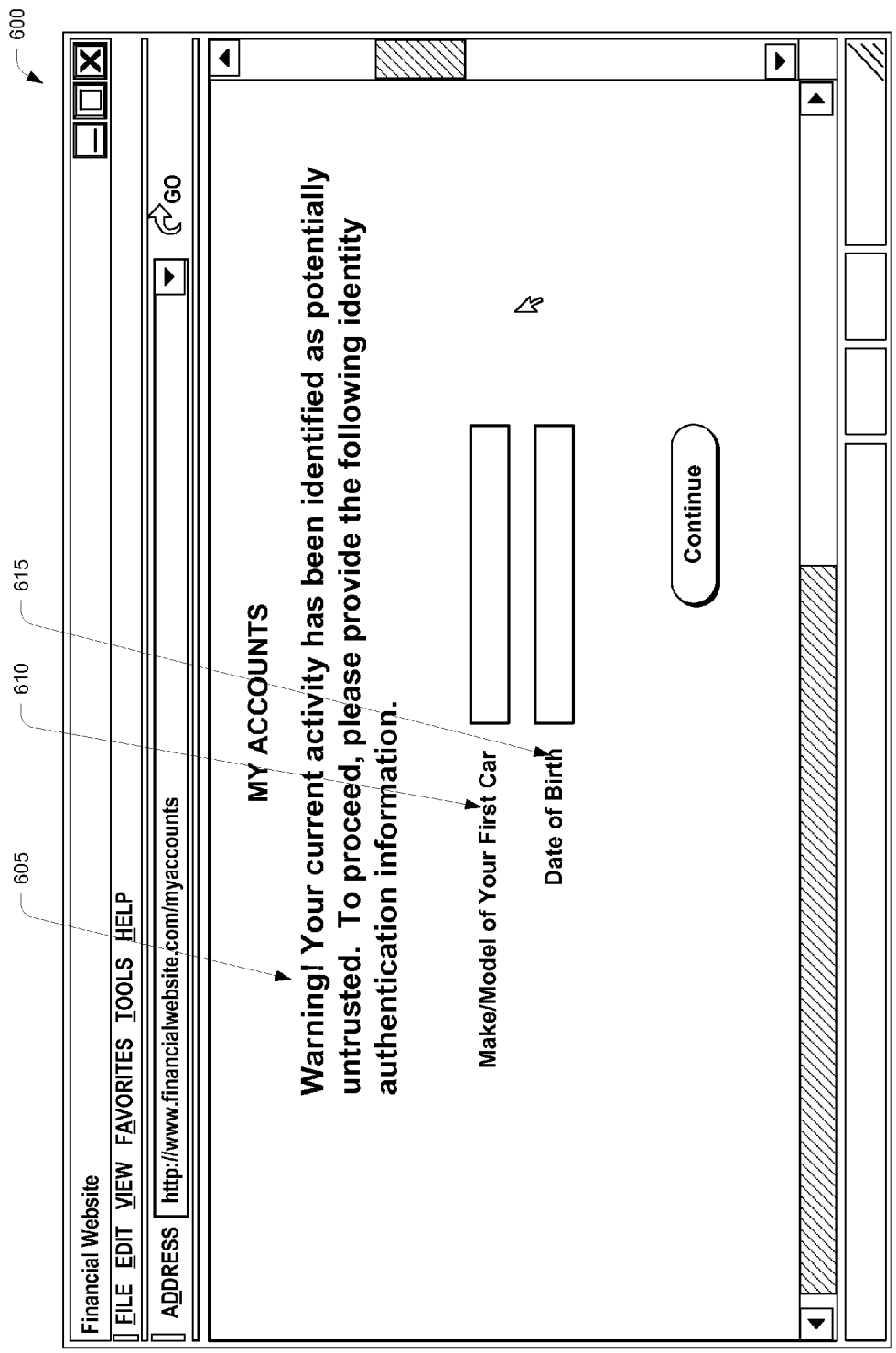
FIG. 6 illustrates another example user interface of an online checkout cart process using an AOA system, such as the AOA system of FIG. 1A, FIG. 1B, FIG. 1C, and/or FIG. 9.

FIG. 6 is another example user interface 600 of a checkout process similar to the one described with respect to FIG. 5 above. In this example the user's activity has again been identified outside the trust level for this particular transaction on this website. As such, the individual is being prompted to provide additional identity authentication information via a display message 605. In this example, the individual is being prompted to provide the make and model of their first car 610 as well as their date of birth 615. And again as was mentioned with respect to FIG. 5, additional information may also be required in any possible combination that the website may decide to setup depending on the particular transaction and trust level.

Figure 7:
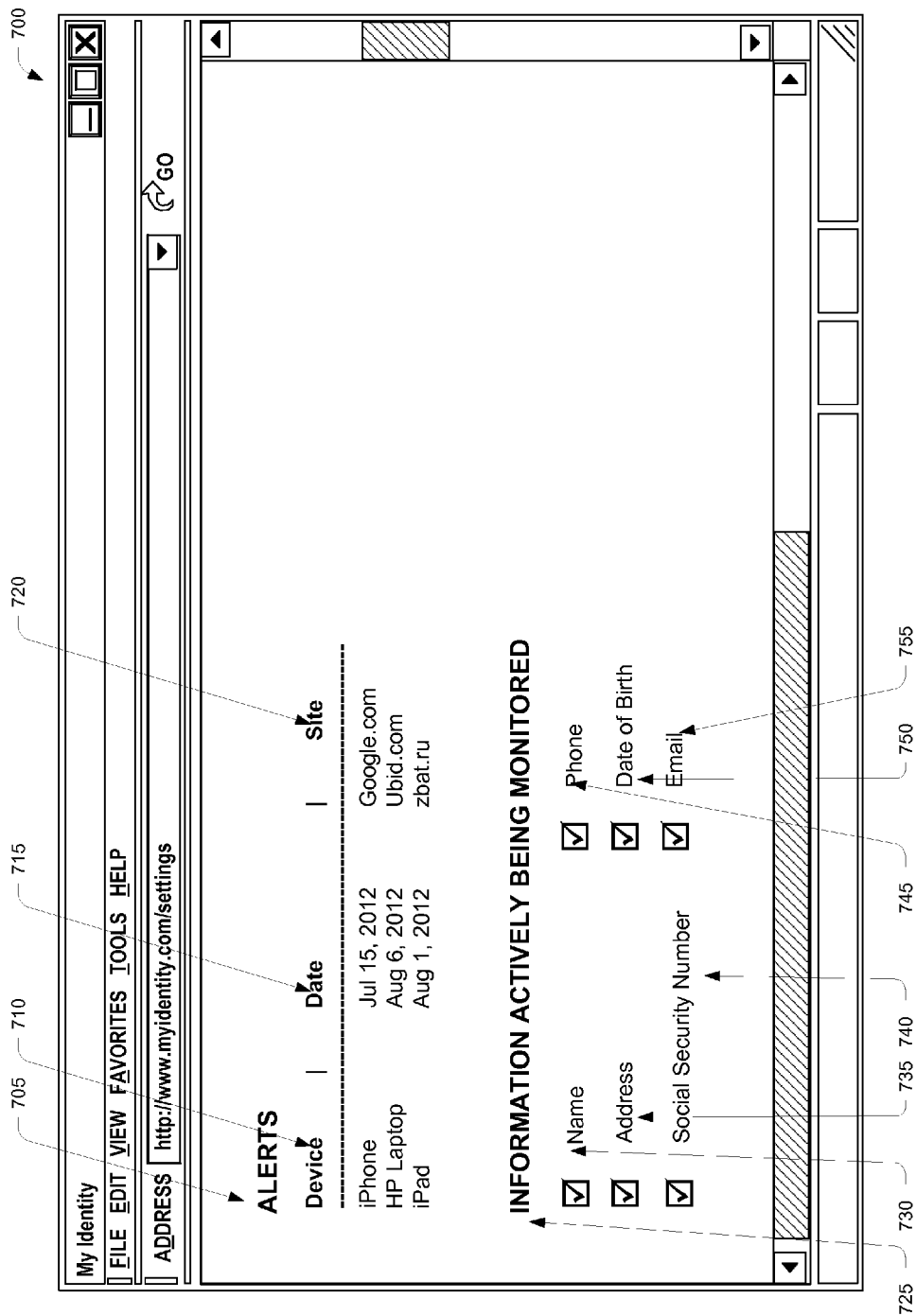
FIG. 7 illustrates an example user interface of a website which allows the individual to manage their identity and/or virtual credentials in accordance with an AOA system, such as the AOA system of FIG. 1A, FIG. 1B, FIG. 1C, and/or FIG. 9.

FIG. 7 illustrates an example user interface 700 of a website which allows the individual to manage their identity and/or virtual credentials in accordance with an embodiment of the AOA system 100, such as the AOA system 100 of FIG. 1A, FIG. 1B, FIG. 1C, and/or FIG. 9. As FIG. 7 shows, the user interface 700 presents various information including alerts 705 which provide an indication of various devices 710, dates 715, and websites 715 associated with the particular transaction being alerted. Thus, for example, here an individual is being shown that on July 15$^{th}$ their iPhone was used to access google.com and as a result an alert may have been generated. Similarly, in another example, on Aug. 6, 2012, the individual's HP laptop may have been used to access ubid.com, and as a result of that transaction an alert may have been generated for the individual. FIG. 7 also illustrates various data fields associated with the individual's personal information which may be actively monitored 725 by the AOA system in conjunction with their virtual credential. In some embodiments, the individual may be presented with the option to selectively choose which of these data fields or personal identifying information to actively monitor. Thus, for example, an individual may want the AOA system to actively monitor usage of their name 760, address 735, social security number 740, phone number 745, date of birth 750, and/or email address 755. Other personal information not shown in FIG. 7 may also be made available for selection for monitoring.

Figure 8:
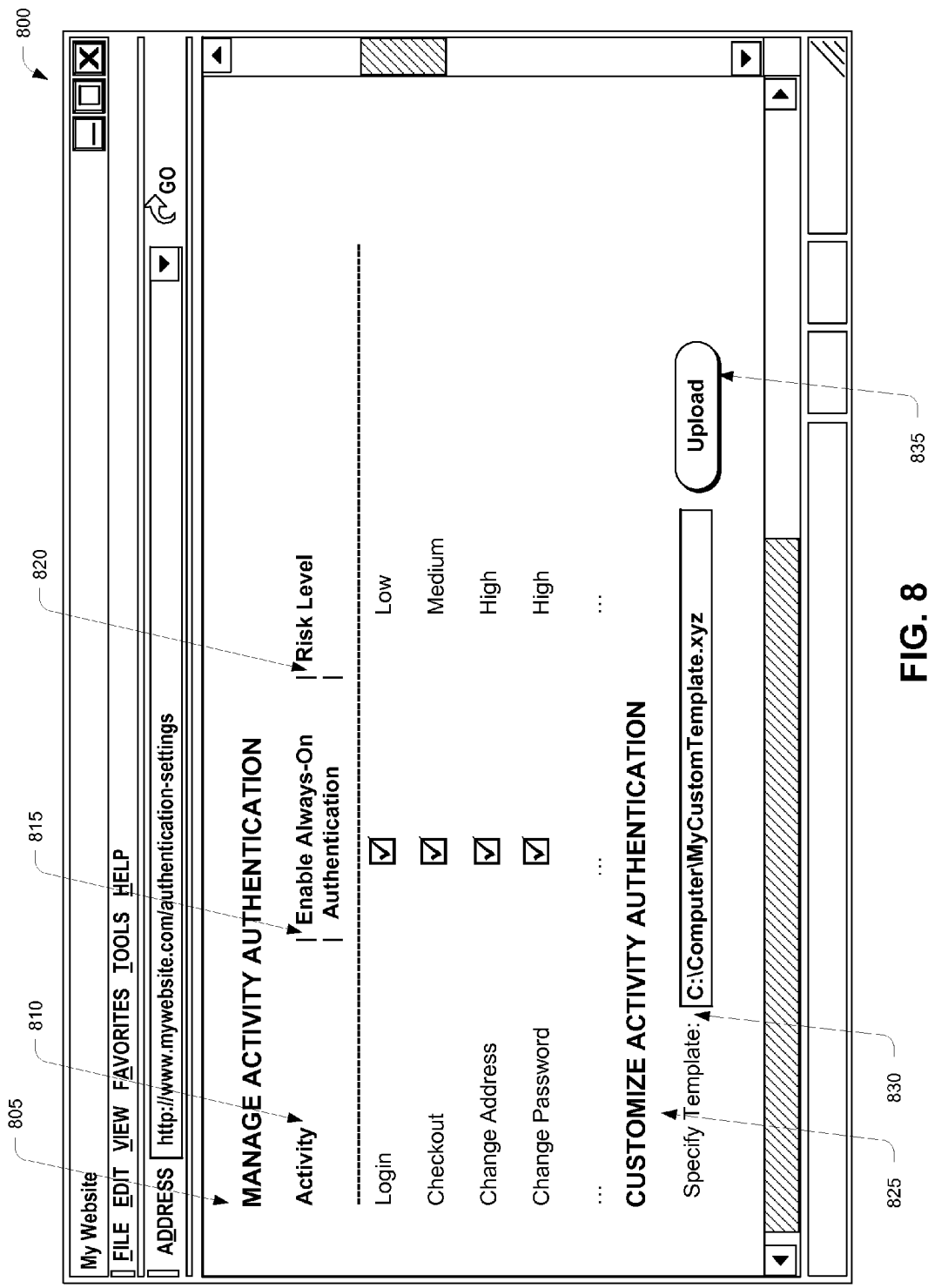
FIG. 8 is an example user interface of a website operator merchant portal whereby a website operator may manage the activity authentication settings associated with its website.

FIG. 8 is an example user interface 800 of a website operator merchant portal whereby a website operator may manage the activity authentication settings associated with its website. In one embodiment, the website operator may be able to manage activity authentication settings 805 associated with various transactions and activities on their website, such as via an activity map which associates certain activities 810 with certain risk levels. For example, as FIG. 8 illustrates, the website operator may be able to configure authentication and/or associate risk levels for activities such as login, checkout, changing an address, changing a password, and other similar activities. As FIG. 8 shows, for each of the activities being configured, the website operator may be presented with an option to enable always-on authentication 815 for a particular activity or transaction and specify a risk level 820 associated with that activity. Thus, for example, in FIG. 8, the website operator has configured the activity of logging in to use always-on authentication, but with a risk level of "low." Thus, for example, an individual may provide their virtual credential to the website and instead of logging in to the website, the virtual credential may provide sufficient authentication. Thus, no further authentication may be required because the risk level has been set to "low." In other embodiments, the risk level may be set higher which may trigger the website to prompt the individual for additional login information along with the virtual credential being provided. Thus, for example, the activity level for "checking out" has been enabled with respect to FIG. 8 with a risk level of "medium." Thus, for example, the individual may not be able to complete the checkout process without first providing some additional authentication information such as a password to the website. Further with respect to FIG. 8, the activity levels of changing an address and changing a password have also been enabled for always-on authentication, but with a risk level of "high" which may trigger the website to require further authentication even if a virtual credential has been provided.

FIG. 8 also illustrates an option for the website operator to customize their activity authentication settings 825. In this example, they may specify a particular template 830 and upload the template 835. The template might include information as described above with respect to various transactions or activities, whether to enable always on authentication for each transaction or activity, and what risk level is acceptable for each transaction or activity. In other embodiments, the template may be more of a web-based template which may include details about the website content itself or website form itself, associate various authentication settings with various web forms and/or elements of web forms may be customizable at various levels of detail.

In some embodiments, the website operator may have the option to tag certain website functionality (e.g., buttons, links, actions, segments of code, etc.) which may be associated with certain risk levels. The tags may be configurable, for example, via the activity map and/or via a configuration user interface such as the one shown in FIG. 8. In some embodiments, the website operator may further be provided an authentication code module configured to access the processes and features of the AOA system directly. For example, the authentication code module may be generated by the AOA system and provided to the website operator, which may then install the code module to enable always-on authentication services for the website or various activities provided by the website. In some embodiments, the authentication code module may be configured to associate activities with risk level, or may be configured to access an activity map and/or other always-on authentication settings associated with the website. The authentication code module may comprise, for example, HTML, Javascript, and/or code in any other programming language useable by a website.

Example System Implementation and Architecture

FIG. 9 is a block diagram showing an embodiment in which an always-on authentication computing system 100 (or simply "computing system 100") is in communication with a network 160 and various systems, such as user computing device(s) 162 and web-based and/or online service(s) 164, are also in communication with the network 160. The computing system 100 may be used to implement systems and methods described herein.

The computing system 100 includes, for example, a personal computer that is IBM, Macintosh, or Linux/Unix compatible or a server or workstation. In one embodiment, the computing system 100 comprises a server, a laptop computer, a smart phone, a personal digital assistant, a kiosk, or an media player, for example. In one embodiment, the exemplary computing system 100 includes one or more central processing unit ("CPU") 105, which may each include a conventional or proprietary microprocessor. The computing system 100 further includes one or more memory 130, such as random access memory ("RAM") for temporary storage of information, one or more read only memory ("ROM") for permanent storage of information, and one or more mass storage device 120, such as a hard drive, diskette, solid state drive, or optical media storage device. Typically, the modules of the computing system 100 are connected to the computer using a standard based bus system 180. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system 100 may be combined into fewer components and modules or further separated into additional components and modules.

The computing system 100 is generally controlled and coordinated by operating system software, such as Windows XP, Windows Vista, Windows 7, Windows 8, Windows Server, Unix, Linux, SunOS, Solaris, iOS, Blackberry OS, or other compatible operating systems. In Macintosh systems, the operating system may be any available operating system, such as MAC OS X. In other embodiments, the computing system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 100 may include one or more commonly available input/output (I/O) devices and interfaces 110, such as a keyboard, mouse, touchpad, and printer. In one embodiment, the I/O devices and interfaces 110 include one or more display devices, such as a monitor, that allows the visual presentation of data to a user. More particularly, a display device provides for the presentation of GUIs, application software data, and multimedia presentations, for example. The computing system 100 may also include one or more multimedia devices 140, such as speakers, video cards, graphics accelerators, and microphones, for example.

In the embodiment of FIG. 9, the I/O devices and interfaces 110 provide a communication interface to various external devices. In the embodiment of FIG. 9, the computing system 100 is electronically coupled to a network 160, which comprises one or more of a LAN, WAN, and/or the Internet, for example, via a wired, wireless, or combination of wired and wireless, communication link 115. The network 160 communicates with various computing devices and/or other electronic devices via wired or wireless communication links.

According to FIG. 9, in some embodiments information may be provided to the computing system 100 over the network 160 from one or more data sources 166. The data sources 166 may include one or more internal and/or external data sources. The data sources 166 may include internal and external data sources which store, for example, credit bureau data (for example, credit bureau data from File One$^{SM}$) and/or other consumer data. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In the embodiment of FIG. 9, the computing system 100 includes a dashboard-user interface module 102, a consumer authentication/validation module 104, an alert module 106, a risk profile/assessment module 107, and a virtual credential, risk profile, and/or identity data source 108. The dashboard/user interface module 102 may be configured to provide one or more user interfaces, for example the user interfaces described with respect to FIGS. 4, 5, 6, 7, and 8, as well as other user interfaces as may be generated by the AOA system 100. The consumer authentication/validation module 104 may be configured to authenticate and/or validate a consumer's identity for example by accessing data in the virtual credential risk profile and/or identity data store 108, and performing various of the methods and processes described herein. The risk profile/assessment module 107 may be configured to access a risk profile stored in the risk profile and/or identity data store 108 and use the risk profile to assess the trust level associated with a particular activity or transaction being referred from the website/online service 164. The risk assessment may be performed with respect to the various processes and methods described herein. The alert module 106 may be configured to provide an alert to an individual in response to a determination that the risk associated with a particular activity or transaction is too high for a particular risk profile associated with the virtual credential of the user. These and other modules in the computing system 100 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Other

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the address verification computing system 100 and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system for monitoring transactions for an individual, the computer system comprising:
   a computing device in communication with a physical data store storing profile data for an individual, wherein the computing device is configured to:
   receive, from a user computing device, a request to authenticate an identity for an individual, wherein the request includes at least some personally identifying information for the individual;
   authenticate the identity of the individual, based on the personally identifying information for the individual and based on profile data for the individual accessed from the physical data store;

issue, to the user computing device, a virtual credential for the individual;

associate the virtual credential with the profile data for the individual;

receive, from a requesting entity, a request to authenticate a transaction, wherein the request includes the virtual credential;

access a risk profile associated with the profile data for the individual, wherein the profile data for the individual is accessed using the virtual credential;

determine whether a level of trust for the transaction is below a threshold trust level, wherein the level of trust is based on an analysis of the risk profile and the transaction; and in response to a determination that the level of trust for the transaction is below the threshold trust level, provide an indication to the requesting entity that further authentication of the individual is recommended.

2. The computer system of claim 1, wherein the computing device is configured to update the risk profile to record information about the transaction in response to a determination that the level of trust for the transaction is not below the threshold trust level.

3. The computer system of claim 1, wherein the level of trust and the threshold trust level are numeric ratings in the range of one to ten.

4. The computer system of claim 1, wherein the level of trust and the threshold trust level are risk ratings indicating a degree of risk associated with a transaction type.

5. The computer system of claim 1, wherein the computing device is further configured to send an alert to the individual in response to a determination that the level of trust for the transaction is below the threshold level.

6. The computer system of claim 1, wherein the risk profile includes a mapping of one or more transaction types and respective one or more threshold trust levels.

7. The computer system of claim 1, wherein the risk profile includes a record of historical transactions for the individual, and wherein the threshold trust level is determined at least in part by analyzing the frequency of historical transactions for the individual.

8. The computer system of claim 1, wherein the transaction is one of a financial transaction, an online interaction between the individual and the requesting entity, a hypertext transfer protocol request, or an activity.

9. The computer system of claim 1, wherein the virtual credential includes a unique digital token, and wherein the virtual credential is associated with one or more computing devices for the individual.

10. A computer-implemented method for authenticating a transaction for an individual, the computer-implemented method comprising:

receiving, from a requesting entity, a request to authenticate a transaction for an individual, wherein the request includes a virtual credential, wherein the virtual credential was provided to the requesting entity from the individual;

accessing a risk profile associated with profile data for the individual, wherein the profile data for the individual is accessed from a profile data store using the virtual credential;

determining whether a level of trust for the transaction is below a threshold trust level, wherein the level of trust is based on an analysis of the risk profile and the transaction; and in response to a determination that the level of trust for the transaction is below the threshold trust level, providing an indication to the requesting entity that further authentication of the individual is recommended; or in response to a determination that the level of trust for the transaction is not below the threshold trust level, updating the risk profile to record information about the transaction.

11. The computer-implemented method of claim 10, further comprising sending an alert to the individual in response to a determination that the level of trust for the transaction is below the threshold level.

12. The computer-implemented method of claim 10, further comprising updating the risk profile to record information about the transaction in response to a determination that the level of trust for the transaction is not below the threshold trust level.

13. The computer-implemented method of claim 10, wherein the risk profile includes a record of historical transactions for the individual, and wherein the threshold trust level is determined at least in part by analyzing the frequency of historical transactions for the individual.

14. The computer-implemented method of claim 10, wherein the risk profile includes a mapping of one or more transaction types and respective one or more threshold trust levels.

15. The computer-implemented method of claim 10, wherein the transaction is one of a financial transaction, an online interaction between the individual and the requesting entity, a hypertext transfer protocol request, or an activity.

16. Non-transitory computer storage having stored thereon a computer program, the computer program including modules configured for execution by a computing system and including at least:

an individual authentication module configured to:
receive, from a user computing device, a request to authenticate an identity for an individual, wherein the request includes at least some personally identifying information for the individual;

authenticate the identity of the individual, based on the personally identifying information for the individual and based on profile data for the individual accessed from the physical data store;

issue, to the user computing device, a virtual credential for the individual;

associate the virtual credential with the profile data for the individual;

a risk assessment module configured to:
receive, from a requesting entity, a request to authenticate a transaction, wherein the request includes the virtual credential;

access a risk profile associated with the profile data for the individual, wherein the profile data for the individual is accessed using the virtual credential;

determine whether a level of trust for the transaction is below a threshold trust level, wherein the level of trust is based on an analysis of the risk profile and the transaction; and in response to a determination that the level of trust for the transaction is below the threshold trust level, provide an indication to the requesting entity that further authentication of the individual is recommended.

17. The non-transitory computer storage of claim 16, wherein the risk assessment module is configured to update the risk profile to record information about the transaction in response to a determination that the level of trust for the transaction is not below the threshold trust level.

18. The non-transitory computer storage of claim 16, wherein the virtual credential includes a unique digital token, and wherein the virtual credential is associated with one or more computing devices for the individual 19. The non-transitory computer storage of claim 16, wherein the risk profile includes a record of historical transactions for the individual, and wherein the threshold trust level is determined at least in part by analyzing the frequency of historical transactions for the individual.

20. The non-transitory computer storage of claim 16, wherein the transaction is one of a financial transaction, an online interaction between the individual and the requesting entity, a hypertext transfer protocol request, or an activity.

* * * * *